United States Patent
Yano et al.

(10) Patent No.: US 10,858,485 B2
(45) Date of Patent: Dec. 8, 2020

(54) MASTER BATCH CONTAINING ACYLATION-MODIFIED MICROFIBRILLATED PLANT FIBERS

(71) Applicants: KYOTO UNIVERSITY, Kyoto (JP); NIPPON PAPER INDUSTRIES CO., LTD, Tokyo (JP)

(72) Inventors: Hiroyuki Yano, Kyoto (JP); Hiroaki Okumura, Kyoto (JP); Hiromasa Kataoka, Chiba (JP); Hironari Sano, Mie (JP)

(73) Assignees: KYOTO UNIVERSITY, Kyoto (JP); NIPPON PAPER INDUSTRIES CO., LTD, Tokyo (JP)

( * ) Notice: Subject to any disclaimer, the term of this patent is extended or adjusted under 35 U.S.C. 154(b) by 74 days.

(21) Appl. No.: 16/085,686

(22) PCT Filed: Mar. 16, 2017

(86) PCT No.: PCT/JP2017/010638
§ 371 (c)(1),
(2) Date: Sep. 17, 2018

(87) PCT Pub. No.: WO2017/159778
PCT Pub. Date: Sep. 21, 2017

(65) Prior Publication Data
US 2019/0092909 A1 Mar. 28, 2019

(30) Foreign Application Priority Data

Mar. 18, 2016 (JP) .................. 2016-056300

(51) Int. Cl.
*C08J 3/22* (2006.01)
*C08L 101/00* (2006.01)
*C08L 97/02* (2006.01)
*C08J 3/00* (2006.01)
*C08J 5/04* (2006.01)

(52) U.S. Cl.
CPC ............... *C08J 3/22* (2013.01); *C08J 3/005* (2013.01); *C08J 5/045* (2013.01); *C08L 97/02* (2013.01); *C08L 101/00* (2013.01); *C08J 2323/02* (2013.01); *C08J 2367/04* (2013.01); *C08J 2377/00* (2013.01); *C08J 2459/00* (2013.01)

(58) Field of Classification Search
CPC ....................................... C08L 1/08; C09J 3/22
See application file for complete search history.

(56) References Cited

U.S. PATENT DOCUMENTS

| | | | | |
|---|---|---|---|---|
| 5,683,844 A * | 11/1997 | Mammino | ............ | G03G 9/1131 427/213 |
| 6,602,994 B1 * | 8/2003 | Cash | ...................... | A61K 8/027 536/30 |
| 7,270,693 B2 * | 9/2007 | Chung | ............... | B01D 39/1623 428/339 |
| 8,022,136 B2 | 9/2011 | Yano et al. | | |
| 8,735,470 B2 * | 5/2014 | Takizawa | .................. | C08J 3/226 524/35 |
| 9,056,969 B2 | 6/2015 | Yano et al. | | |
| 9,512,304 B2 * | 12/2016 | Yano | ......................... | C08B 3/12 |
| 2003/0065059 A1 * | 4/2003 | Krishnaswamy | ....... | C08L 33/20 524/1 |
| 2009/0298976 A1 * | 12/2009 | Yano | ......................... | C08J 5/045 524/35 |
| 2010/0076118 A1 | 3/2010 | Yano et al. | | |
| 2012/0214911 A1 | 8/2012 | Yano et al. | | |
| 2012/0277351 A1 * | 11/2012 | Yano | ..................... | D21H 11/18 524/35 |

(Continued)

FOREIGN PATENT DOCUMENTS

| | | |
|---|---|---|
| JP | 2009-84564 | 4/2009 |
| JP | 2011-231285 | 11/2011 |

(Continued)

OTHER PUBLICATIONS

International Search Report dated Jun. 20, 2017 in International (PCT) Application No. PCT/JP2017/010638.
Lee et al., "Conversion of Lignocellulosic Biomass to Nanocellulose: Structure and Chemical Process", The Scientific World Journal, vol. 2014, Article ID 631013, 2014, pp. 1-20.
Sathitsuksanoh et al., "New lignocellulose pretreatments using cellulose solvents: a review", J. Chem. Technol. Biotechnol., vol. 88, Nov. 2012, pp. 169-180.
Ide, "Jitsuyo Polymer Alloy Sekkei, [Practical Design of Polymer Alloys]", Kogyo Chosakai Publishing Co. Ltd., first printing, 1996, p. 19, with partial English translation.

(Continued)

*Primary Examiner* — Liam J Heincer
(74) *Attorney, Agent, or Firm* — Wenderoth, Lind & Ponack, L.L.P.

(57) ABSTRACT

An object of the present invention is to provide a highly versatile master batch for producing a fiber-reinforced resin composition with high strength even when a highly hydrophobic resin is used as a resin for dilution (a resin that constitutes a fiber-reinforced resin composition). The master batch contains AcylMFs (A), a Pm (B), and a Com (C) and is for use in the production of a fiber-reinforced resin composition by mixing with a Pd (D), wherein the AcylMFs (A), Pm (B), Com (C), and Pd (D) satisfy the following conditions: (a) the AcylMFs (A) have an $SP_{acylmf}$ of 10 or more; (b) the Pm (B) has an $SP_{pm}$ of 9 to 15, and the $SP_{pm}$ is equal to or greater than the $SP_{pd}$ of the Pd (D); and (c) the Com (C) has an $SP_{com}$ equal to or less than the $SP_{acylmf}$ of the AcylMFs (A).

9 Claims, 1 Drawing Sheet

(56) References Cited

U.S. PATENT DOCUMENTS

| | | | | |
|---|---|---|---|---|
| 2012/0309898 | A1* | 12/2012 | Hamada | C08B 15/05 525/54.23 |
| 2013/0345415 | A1* | 12/2013 | Trigiante | C08B 3/10 536/63 |
| 2015/0105499 | A1 | 4/2015 | Yano et al. | |
| 2015/0166741 | A1* | 6/2015 | Ikuma | C08J 5/045 524/37 |
| 2016/0208087 | A1* | 7/2016 | Virtanen | D06M 11/50 |
| 2016/0237229 | A1* | 8/2016 | Ikuma | C08F 251/02 |
| 2018/0037737 | A1 | 2/2018 | Semba et al. | |
| 2019/0185587 | A1* | 6/2019 | Yoshida | C08B 11/08 |

FOREIGN PATENT DOCUMENTS

| | | | |
|---|---|---|---|
| JP | 5119432 | 1/2013 | |
| JP | 5496435 | 5/2014 | |
| JP | 2015-59206 | 3/2015 | |
| JP | 2015-183153 | 10/2015 | |
| JP | 2017-95628 | 6/2017 | |
| WO | 2011/049162 | 4/2011 | |
| WO | WO-2013133093 A1 * | 9/2013 | C08L 23/06 |
| WO | 2016/148233 | 9/2016 | |

OTHER PUBLICATIONS

Fedors "A Method for Estimating Both the Solubility Parameters and Molar Volumes of Liquids", Polymer Engineering and Science, vol. 14, No. 2, Feb. 1974, pp. 147-154.

National Institute for Materials Science, http://polymer.nims.go.jp/PoLyInfo/cgi-bin/p-search.cgi.

* cited by examiner

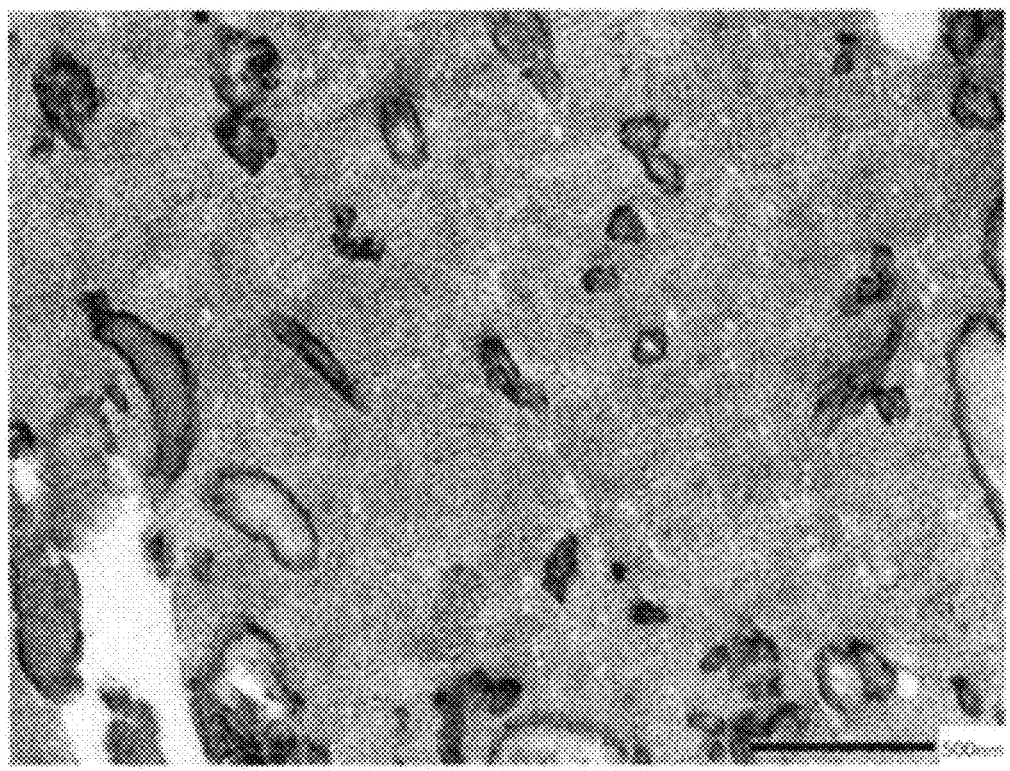
(A transmission electron microscope (TEM) image of an Example (KH-217))

MASTER BATCH CONTAINING ACYLATION-MODIFIED MICROFIBRILLATED PLANT FIBERS

TECHNICAL FIELD

The present invention relates to a master batch containing acylated, microfibrillated plant fibers, a thermoplastic resin for a master batch, and a compatibilizer.

BACKGROUND ART

Microfibrillated plant fibers, which are light and highly strong, and have a high elastic modulus and a low linear thermal expansion coefficient, are suitably used as reinforcing materials for resin compositions. Their use enables the production of a fiber-reinforced resin composition.

Conventionally, fiber-reinforced resin compositions can be produced by using a method in which plant fibers and a resin are kneaded all at once. Further, a previously known production method comprises first producing a master batch containing plant fibers, followed by kneading the thus-obtained master batch with a resin (a resin for dilution). This method involving the production of a master batch is advantageous in terms of raw-material storage, transportation, handling, etc., compared to methods that involve kneading all at once.

For a composition containing plant fibers and a resin to exert high strength, it is essential for the plant fibers and the resin to be sufficiently mixed, and the plant fibers to be sufficiently dispersed in the resin. Thus, when producing a master batch for use in a fiber-reinforced resin composition, it is required that plant fibers and the resin for the master batch be sufficiently mixed, and the plant fibers be sufficiently dispersed in the resin for the master batch. It is further required that the resin for the master batch be also sufficiently mixed with a resin that constitutes a resin composition (a resin for dilution), and the plant fibers be sufficiently dispersed in the resin for dilution.

Due to these requirements, combinations of the resin for a master batch and the resin for dilution that constitutes a resin composition are limited. As a result, the same or very similar resins are used for the resin for a master batch and the resin for dilution, and so the versatility of the master batch is low.

For example, the technique of Patent Literature (PTL) 1 is intended to produce a highly strong molding material by uniformly dispersing microfibrillated plant fibers in a highly hydrophobic resin. This technique provides a method for producing a plant-fiber-reinforced resin composition, the method comprising mixing alkyl or alkenyl succinic anhydride-modified plant fibers and/or microfibrillated plant fibers with a resin for a master batch in the presence of an organic liquid, followed by drying to produce a master batch, and melt-kneading the master batch with a resin for dilution.

Further, the technique disclosed in PTL 2 is intended to produce a microfibrillated-cellulose-containing resin molded article with an improved elastic modulus and strength. In this technique, a biodegradable resin, such as polylactic acid, is used as the resin for the resin molded article.

In terms of the currently available master batches, these disclosures in PTL 1 and 2 reveal that the same or very similar resins are used as the resin for a master batch and the resin for dilution (resin that constitutes a fiber-reinforced resin composition).

CITATION LIST

Patent Literature

PTL 1: Japanese Patent No. 5496435
PTL 2: Japanese Patent No. 5119432

SUMMARY OF INVENTION

Technical Problem

An object of the present invention is to provide a highly versatile master batch that is flexibly applicable to combinations of components for producing a fiber-reinforced resin composition with high strength even when a highly hydrophobic resin is used as a resin for dilution (a resin that constitutes a fiber-reinforced resin composition).

Another object of the present invention is to provide a fiber-reinforced resin composition with high strength using the master batch, and to provide a fiber-reinforced resin molded article comprising the fiber-reinforced resin composition.

Still another object of the present invention is to provide a method for easily producing a master batch.

Solution to Problem

The present inventors found that when plant fibers modified with acyl groups (hereinafter also referred to as "acylated plant fibers"), a resin for a master batch, and a compatibilizer are combined in accordance with specific solubility parameters, and melt-knead, the acylated plant fibers are easily microfibrillated (defibrated) in the master batch.

This technique in which each component is combined (selected) in accordance with each solubility parameter is for producing a master batch; the resulting highly versatile master batch is for use in the production of a fiber-reinforced resin composition.

The present invention provides the following master batch and the following fiber-reinforced resin composition containing the master batch and a resin for dilution, and also provides the following fiber-reinforced resin molded article comprising the fiber-reinforced resin composition.

Item 1.
A master batch containing:
acylated, microfibrillated plant fibers (A);
a thermoplastic resin (B); and
a compatibilizer (C),
wherein the master batch is for use in the production of a fiber-reinforced resin composition by mixing with a resin for dilution (D), and
wherein the acylated, microfibrillated plant fibers (A), the thermoplastic resin (B), the compatibilizer (C), and the resin for dilution (D) satisfy the following conditions:
(a) the acylated, microfibrillated plant fibers (A) have a solubility parameter ($SP_{acylmf}$) of 10 or more,
(b) the thermoplastic resin (B) has a solubility parameter ($SP_{pm}$) of 9 to 15, and the solubility parameter ($SP_{pm}$) is equal to or greater than the solubility parameter ($SP_{pd}$) of the resin for dilution (D), and (c) the compatibilizer (C) has a solubility parameter ($SP_{com}$) equal to or less than the solubility parameter ($SP_{acylmf}$) of the acylated, microfibrillated plant fibers (A).

Item 2.

The master batch according to claim 1, wherein the thermoplastic resin (B) is at least one resin selected from the group consisting of polylactic acid, copolymers of lactic acid and glycolic acid, polyamide, polyacetal, and copolymers of acetal and oxyethylene.

Item 3.

The master batch according to claim 1 or 2, wherein the compatibilizer (C) is at least one compatibilizer selected from the group consisting of modified polyolefins and graft copolymers of a different type of polymer and a polyolefin.

Examples of the different type of polymer constituting the graft copolymer include polyamide (PA), polylactic acid (PLA), polyvinyl acetate (PVAc), and the like.

Item 4.

A fiber-reinforced resin composition containing the master batch of any one of claims 1 to 3 and a resin for dilution (D).

Item 5.

The fiber-reinforced resin composition according to claim 4, wherein the resin for dilution (D) is at least one resin selected from the group consisting of polyethylene, polypropylene, ethylene-propylene copolymers, polyisobutylene, polyisoprene, and polybutadiene.

Item 6.

A fiber-reinforced resin molded article comprising the fiber-reinforced resin composition of claim 4 or 5.

Item 7.

A method for producing a master batch containing acylated, microfibrillated plant fibers (A), a thermoplastic resin (B), and a compatibilizer (C), the master batch being for use in the production of a fiber-reinforced resin composition by mixing with a resin for dilution (D), the method comprising the step of melt-kneading acylated plant fibers (A') as a raw material of acylated, microfibrillated plant fibers (A), a thermoplastic resin (B), and a compatibilizer (C) to defibrate the acylated plant fibers (A') in a melt-kneaded product while melt-kneading, wherein the following conditions are satisfied:

(a) the acylated, microfibrillated plant fibers (A) have a solubility parameter ($SP_{acylmf}$) of 10 or more;

(b) the thermoplastic resin (B) has a solubility parameter ($SP_{pm}$) of 9 to 15, and the solubility parameter ($SP_{pm}$) is equal to or greater than the solubility parameter ($SP_{pm}$) of the resin for dilution (D); and (c) the compatibilizer (C) has a solubility parameter ($SP_{com}$) equal to or less than the solubility parameter ($SP_{acylmf}$) of the acylated, microfibrillated plant fibers (A).

Item 8.

A method for producing a master batch containing acylated, microfibrillated plant fibers (A), a thermoplastic resin (B), and a compatibilizer (C), the master batch being for use in the production of a fiber-reinforced resin composition by mixing with a resin for dilution (D), the method comprising the steps of:

(1) melt-kneading acylated plant fibers (A') as a raw material of acylated, microfibrillated plant fibers (A) and a thermoplastic resin (B) to defibrate the acylated plant fibers (A') in a melt-kneaded product while melt-kneading to obtain a melt-kneaded product containing the acylated, microfibrillated plant fibers (A), wherein the following conditions are satisfied:

(a) the acylated, microfibrillated plant fibers (A) have a solubility parameter ($SP_{acylmf}$) of 10 or more; and (b) the thermoplastic resin (B) has a solubility parameter ($SP_{pm}$) of 9 to 15, and the solubility parameter ($SP_{pm}$) is equal to or greater than the solubility parameter ($SP_{pd}$) of the resin for dilution (D), and (2) adding a compatibilizer (C) to the melt-kneaded product containing the acylated, microfibrillated plant fibers (A) obtained in step (1) to further perform melt-kneading, wherein the following condition is satisfied:

(c) the compatibilizer (C) has a solubility parameter ($SP_{com}$) equal to or less than the solubility parameter ($SP_{acylmf}$) of the acylated, microfibrillated plant fibers (A).

Item 9.

A method for producing a fiber-reinforced resin composition, the method comprising the steps of:

(1) adding a resin for dilution (D) to the master batch of any one of claims 1 to 3 to perform melt-kneading; and (2) further adding a resin for dilution (D) to the melt-kneaded product obtained in step (1) to perform melt-kneading.

Advantageous Effects of Invention

The master batch of the present invention is highly versatile and is flexibly applicable to combinations of components for use in the production of a fiber-reinforced resin composition with high strength when a highly hydrophobic resin is used as a resin for dilution (a resin that constitutes a fiber-reinforced resin composition).

When the master batch of the present invention is mixed with a resin for dilution, a fiber-reinforced resin composition with high strength and a fiber-reinforced resin molded article comprising this fiber-reinforced resin composition can be produced.

The method for producing a master batch of the present invention is simple.

BRIEF DESCRIPTION OF DRAWINGS

FIG. 1 illustrates a transmission electron microscope image of a cross-sectional surface of a molded article prepared using a master batch (containing AcylMF, Pm, and Com) of the present invention to which Pd was added to dilute the master batch. The molded article was sliced in the direction perpendicular to the molding direction and observed with a transmission electron microscope (TEM).

DESCRIPTION OF EMBODIMENTS

The master batch of the present invention is described below in detail.

(1) Master Batch

The master batch of the present invention contains acylated, microfibrillated plant fibers (A) (hereinafter also referred to as "AcylMFs"), a thermoplastic resin (B) (a thermoplastic resin for a master batch, hereinafter also referred to as "Pm" (a polymer for a master batch)), and a compatibilizer (C) (hereinafter also referred to as "Com" (a compatibilizer)). The master batch is for use in the production of a fiber-reinforced resin composition by mixing with a resin for dilution (D) (hereinafter also referred to as "Pd" (a polymer for dilution)). The acylated, microfibrillated plant fibers (A), the thermoplastic resin (B), the compatibilizer (C), and the resin for dilution (D) satisfy the following conditions:

(a) the acylated, microfibrillated plant fibers (A) have a solubility parameter ($SP_{acylmf}$) of 10 or more, (b) the thermoplastic resin (B) has a solubility parameter ($SP_{pm}$) of 9 to 15, and the solubility parameter ($SP_{pm}$) is equal to or greater than the solubility parameter ($SP_{pd}$) of the resin for dilution (D), and (c) the compatibilizer (C) has a solubility parameter ($SP_{com}$) equal to or less than the solubility parameter ($SP_{acylmf}$) of the acylated, microfibrillated plant fibers (A).

(1-1) Acylated, Microfibrillated Plant Fibers (AcylMFs) (A)

The master batch of the present invention contains AcylMFs (A).

The acylated, microfibrillated plant fibers have a solubility parameter ($SP_{acylmf}$) of 10 or more.

Three hydroxyl groups are present in a repeating unit of a cellulose molecule that constitutes plant fibers. The present invention uses microfibrillated plant fibers (hereinafter also referred to as "MFs") in which the hydroxyl groups present in a cellulose molecule are modified with acyl groups. This is called "acylated, microfibrillated plant fibers" (AcylMFs).

In the present invention, AcylMFs having a solubility parameter (SP) optimal for the thermoplastic resin (Pm) and/or the resin for dilution (Pd) can be selected based on the degree of acylation of the AcylMFs (hereinafter referred to as "$DS_{acyl}$").

The acylation of MFs improves dispersibility of the AcylMFs in the Pm of the master batch and fiber-reinforced resin composition of the present invention, and enhances the reinforcing effect of the AcylMFs on the Pm, thus providing a fiber-reinforced resin composition with excellent mechanical properties.

The AcylMFs endure melt-kneading with a resin having a high melting point of 200° C. or higher, and repeated melt-kneading.

Plant Fibers (Cellulose and Lignocellulose)

Examples of plant fibers used as a raw material of the AcylMFs include fibers obtained from natural plant raw materials containing cellulose, such as wood, bamboo, hemp, jute, kenaf, cotton, beat, agricultural waste, and cloth. Examples of paper used as a raw material of the AcylMFs include deinked recycled wastepaper, cardboard recycled wastepaper, magazines, copy paper, and the like. Examples of the wood include Sitka spruce, *Cryptomeria japonica, Chamaecyparis obtusa, eucalyptus*, acacia, and the like.

Lignocellulose can also be used as a raw material of the AcylMFs. Lignocellulose is a composite hydrocarbon polymer and forms cell walls of plants. Lignocellulose is known to be mainly composed of cellulose and hemicellulose, which are polysaccharides, and lignin, which is an aromatic polymer.

Reference Example 1

Review Article, Conversion of lignocellulosic biomass to nanocellulose: structure and chemical process, H. V. Lee, S. B. A. Hamid, and S. K. Zain, Scientific World Journal, Volume 2014, Article ID 631013, 20 pages, http://dx-.doi.org/10.1155/2014/631013

Reference Example 2

New lignocellulose pretreatments using cellulose solvents: a review, Noppadon Sathitsuksanoh, Anthe George and Y-H Percival Zhang, J Chem Technol Biotechnol 2013; 88: 169-180

The term "lignocellulose" as used herein refers to lignocellulose having a chemical structure naturally occurring in a plant and/or a mixture of such lignocellulose, or an artificially modified lignocellulose and/or a mixture of such lignocelluloses.

The mixture may include a lignocellulose and/or mixtures thereof having a chemical structure that exists in a variety of pulp obtained through mechanically and/or chemically treating natural plants, including wood.

Lignocellulose is not limited to lignocellulose having a naturally occurring chemical structure. The lignin content of lignocellulose is also not limited.

The terms "lignocellulose" and "ligno pulp" as used herein include cellulose and pulp containing only a trace amount of a lignin component.

As a raw material of lignocellulose, fibers containing lignocellulose or an aggregate of fibers containing lignocellulose can be used. As a raw material of lignocellulose, the same raw materials as raw materials of the plant fibers described above may be used.

Plant cell walls are mainly composed of lignocellulose. Plant cell walls usually have such a structure that about 40 cellulose molecules are bound together by hydrogen bonding to form a cellulose microfibril of usually about 4 to 5 nm in width, and several of the cellulose microfibrils combine to form cellulose microfibers (a bundle of cellulose microfibrils). It is known that hemicellulose is present in gaps between and/or around cellulose microfibrils, and that lignin exists in such a manner as to fill the gaps between cellulose microfibrils.

Further, pulp can be used as a raw material for producing plant fibers or lignocellulose. Pulp is obtained by chemically and/or mechanically treating plant-derived materials, such as wood, and obtaining fibers by extraction from the plant-derived materials. By adjusting the degree of chemical and biochemical treatment of the plant-derived materials, the hemicellulose and lignin contents are reduced, and fibers containing cellulose as a main component are obtained.

Examples of wood for producing pulp include Sitka spruce, *Cryptomeria japonica, Chamaecyparis obtusa*, eucalyptus, acacia, and the like.

Pulp comprises lignocellulose and is mainly composed of cellulose, hemicellulose, and lignin. Pulp can be obtained by treating a raw material by, for example, a mechanical pulping method, a chemical pulping method, or a combination of mechanical pulping and chemical pulping methods. The mechanical pulping method is a method of pulping by the mechanical power of a grinder, refiner, or the like, while maintaining lignin. The chemical pulping method is a method of pulping by adjusting the lignin content using a chemical.

Examples of pulp obtained by a mechanical pulping method (mechanical pulp, MP) include ground pulp (GP), refiner GP (RGP), thermomechanical pulp (TMP), chemithermomechanical pulp (CTMP), bleached chemical thermomechanical pulp (BCTMP), and the like.

Examples of chemical pulp (CP) include sulfite pulp (SP), soda pulp (AP), kraft pulp (KP), dissolving craft pulp (DKP), and the like.

Examples of pulp produced by a combination of mechanical pulping and chemical pulping methods include chemimechanical pulp (CMP), chemiground pulp (CGP), semichemical pulp (SCP), and the like. Examples of semichemical pulp (SCP) include pulp produced by a sulfite method, a cold-soda method, a kraft method, a soda method, and the like.

These raw materials may optionally be subjected to delignification or bleaching to adjust the lignin content of the pulp.

Kraft pulps, which have high fiber strength, are preferably used as a raw material of the AcylMFs. Of kraft pulps as a raw material of the AcylMFs, it is more preferable to use needle-bleached kraft pulp (hereinafter also referred to as "NBKP"), needle unbleached kraft pulp (hereinafter also referred to as "NUKP"), and needle-oxygen-bleached kraft pulp (hereinafter also referred to as "NOKP").

Usable pulp also includes pulp that is produced by a pulping method and in which lignin derived from plant raw material is not completely removed and so lignin is moderately present.

In this specification, undefibrated plant fibers and/or pulps are sometimes collectively referred to as "CFs."

When lignocellulose is used as a raw material of the AcylMFs, the content of lignin in lignocellulose or an aggregate of lignocellulose fibers (ligno pulp) is not particularly limited. From the viewpoint of strength, thermal stability, etc. of the obtained AcylMFs, the lignin content is preferably about 0.1 to 50 mass %, more preferably about 0.1 to 40 mass %, and even more preferably about 0.1 to 35 mass %. The lignin content can be measured by using the Klason method.

Compared with lignin-free cellulose and/or pulp, lignocellulose and/or ligno pulp is simple in terms of the production process. Lignocellulose and ligno pulp are advantageous in terms of production costs because they can be obtained from a raw material such as wood with a high yield and can be produced with low energy. As a raw material of the AcylMFs, lignocellulose and/or ligno pulp can be preferably used.

As a raw material of the AcylMFs, it is also possible to use undefibrated plant fibers in which hydroxyl groups present in a cellulose molecule are modified with acyl groups. This is called "acylated plant fibers" (hereinafter also referred to as "AcylCFs").

It is preferable to use plant fibers modified with acyl (AcylCFs, acylated pulp) and plant fibers modified with, for example, acetyl from among acyl groups (acetylated pulp, hereinafter also referred to as "AcCFs"), such as acetylated needle-bleached kraft pulp, which has been modified with acetyl groups ($CH_3$—CO—) (hereinafter also referred to as "AcNBKP"), acetylated needle-unbleached kraft pulp (hereinafter also referred to as "AcNUKP"), and acetylated needle-oxygen-bleached kraft pulp (hereinafter also referred to as "AcNOKP").

The above raw materials of the AcylMFs may be used alone or in a combination of two or more.

Method for Preparing Microfibrillated Plant Fibers (MFs)

Microfibrillated plant fibers (hereinafter also referred to as "MFs") can be prepared by defibrating plant fibers and/or pulp (including lignocellulose and ligno pulp).

For example, it is preferable that an aqueous suspension or slurry of a cellulose-fiber-containing material as plant fibers be mechanically milled or beaten for defibration using a refiner, a high-pressure homogenizer, a grinder, a single-screw or multi-screw kneader (preferably a twin-screw kneader), a bead mill, or the like. These defibration methods may optionally be combined.

When a Pm (B) and a Com (C), described later, are added to the AcylCFs used as plant fibers, and the resulting mixture is melt-kneaded, the AcylCFs are defibrated into AcylMFs. The melt-kneading is preferably performed with heating using a single-screw or multi-screw kneader. The melt-kneading is more preferably performed using a twin-screw kneader.

The AcylMFs after defibration are easily mixed with the Pm (B) and the Com (C), and thus easily dispersed in these media.

AcylMFs are obtained by defibrating the fibers in a cellulose-fiber-containing material (CFs, pulp prepared from wood, etc.), to a nanosize level. The AcylMFs preferably have an average fiber diameter (fiber width) of about 4 to 200 nm, and an average fiber length of about 5 pm or more. The average fiber diameter of CNFs is preferably about 4 to 150 nm, and more preferably about 4 to 100 nm.

The average of the fiber diameter (average fiber diameter) and the average of the fiber length (average fiber length) of AcylMFs are determined by measuring the fiber diameter and fiber length of at least 50 AcylMFs in the visual field of an electron microscope, and calculating the average. The defibration improvement of the fibers can be observed with a scanning electron microscope (SEM).

The fiber diameter and fiber length can be measured using a Kajaani fiber length analyzer produced by Metso Automation Co., Ltd.

As long as the effect of the present invention is achieved, the master batch of the present invention may contain plant fibers that are insufficiently defibrated and thus have a fiber diameter greater than the fiber diameter of the AcylMFs described above.

The specific surface area of AcylMFs is preferably about 70 to 300 $m^2/g$, more preferably about 70 to 250 $m^2/g$, and even more preferably about 100 to 200 $m^2/g$. When the AcylMFs that have a high specific surface area are used to produce a fiber-reinforced resin composition by mixing with a Pd (D) (a matrix resin), mentioned later, the contact area of the AcylMFs with the Pd (D) increases, which is preferable.

The preparation of a resin molding material and/or a resin molded article from a fiber-reinforced resin composition containing the AcylMFs achieves improved strength. Further, since the AcylMFs do not easily aggregate in the Pd (D) of the fiber-reinforced resin composition, the resulting resin molding material has improved strength.

Acylation of MFs (AcylMFs)

In the AcylMFs, hydroxyl groups present in the cellulose molecules of MFs (cellulose, hemicellulose, and lignin in lignocellulose) are modified with acyl. Specifically, hydroxyl groups present on the surface of MFs are hydrophobized (R—CO—) with acyl (alkanoyl).

In the AcylMFs, the hydroxyl groups present on the surface of MFs are preferably modified with lower acyl. "Lower" indicates that the carbon number is 1 to 5. When an acyl group (R—CO—) is referred to as "lower acyl," R represents an alkyl group having 1 to 5 carbon atoms. Examples include linear or branched alkyl groups, such as methyl, ethyl, propyl (n-propyl), isopropyl, butyl (n-butyl), isobutyl, tert-butyl (pival), and pentyl (n-pentyl).

From the viewpoint of ease of production and production costs, the AcylMFs are particularly preferably acetylated, microfibrillated plant fibers (hereinafter also referred to as "AcMFs"), which are modified with acetyl ($CH_3$—CO—). That is, the hydroxyl groups present on the surface of MFs are hydrophobized by acetyl.

The AcylMFs can be prepared by acylating MFs.

The AcylMFs may also be prepared by defibrating acylated plant fibers (AcylCFs). For example, as described in the "Method for Producing a Master Batch" section below, acylated plant fibers (AcylCFs) (A') are mixed with a mixture of a Pm (B) and a Com (C), and the resulting mixture is melt-kneaded to defibrate the AcylCFs, whereby AcylMFs can be easily prepared in the melt-kneaded product.

Melt-kneading of an AcylCF-containing master batch causes shear force, allowing defibration of the AcylCFs into AcylMFs. Even when the AcylCFs are not completely defibrated, and the resulting AcylMFs contain undefibrated AcylCFs, (i.e., even when it is a mixture of AcylMFs and AcylCFs), the mixture of AcylMFs and AcylCFs represents AcylMFs in this specification as long as the mixture of AcylMFs and AcylCFs show an effect as a reinforcing material for a fiber-reinforced resin composition.

AcylMFs and AcylCFs are preferably such that hydroxyl group(s) present in cellulose or hemicellulose (including lignocellulose) (namely, hydroxyl groups in sugar chains), or both, are substituted with the residue remaining after removing hydrogen atoms from carboxy groups of at least one compound selected from the group consisting of saturated fatty acids, unsaturated carboxylic acids, mono-unsaturated fatty acids, di-unsaturated fatty acids, tri-unsaturated fatty acids, tetra-unsaturated fatty acids, penta-unsaturated fatty acids, hexa-unsaturated fatty acids, aromatic carboxylic acid, dicarboxylic acids, amino acids, maleimide compounds represented by:

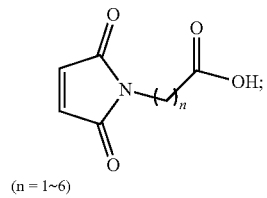

(n = 1~6)

phthalimide compounds represented by:

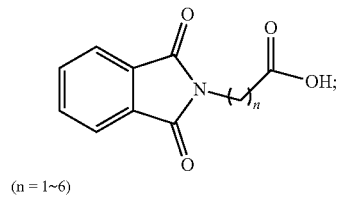

(n = 1~6)

and the like.

AcylMFs and/or AcylCFs are preferably such that one or more hydroxyl groups in sugar chains of cellulose in plant fibers (cellulose-containing material) are acylated with the residue remaining after removing hydroxyl groups from carboxyl groups of the above carboxylic acids (acyl (alkanoyl)).

The acyl group in the AcylMFs and/or AcylCFs is preferably a residue obtained by removing hydrogen from the carboxyl group of at least one saturated fatty acid selected from the group consisting of formic acid, acetic acid, propionic acid, butyric acid, valeric acid, pivalic acid, hexanoic acid (caproic acid), heptanoic acid (enanthic acid), octanoic acid (caprylic acid), pelargonic acid, decanoic acid (capric acid), undecylic acid, lauric acid, tridecyl acid, myristic acid, pentadecylic acid, palmitic acid, margaric acid, stearic acid, nonadecylic acid, and arachidic acid. Moreover, the acyl group in the AcylMFs and/or AcylCFs is preferably a residue obtained by removing hydrogen from the carboxyl group of at least one aromatic, substituted, saturated fatty acid selected from the group consisting of phenoxyacetic acid, 3-phenoxypropionic acid, 4-phenoxybutyric acid, and 5-phenoxyvaleric acid.

The acyl group in the AcylMFs and/or AcylCFs is preferably a residue obtained by removing hydrogen from the carboxyl group of at least one unsaturated carboxylic acid selected from the group consisting of acrylic acid and methacrylic acid.

The acyl group in the AcylMFs and/or AcylCFs is preferably a residue obtained by removing hydrogen from the carboxyl group of at least one mono-unsaturated fatty acid selected from the group consisting of crotonic acid, myristoleic acid, palmitoleic acid, oleic acid, and ricinoleic acid.

The acyl group in the AcylMFs and/or AcylCFs is preferably a residue obtained by removing hydrogen from the carboxyl group of at least one di-unsaturated fatty acid selected from the group consisting of sorbic acid, linolic acid, and eicosadienoic acid.

The acyl group in the AcylMFs and/or AcylCFs is preferably a residue obtained by removing hydrogen from the carboxyl group of at least one tri-unsaturated fatty acid selected from the group consisting of linolenic acid, pinolenic acid, and eleostearic acid.

The acyl group in the AcylMFs and/or AcylCFs is preferably a residue obtained by removing hydrogen from the carboxyl group of at least one tetra-unsaturated fatty acid selected from the group consisting of stearidonic acid and arachidonic acid.

The acyl group in the AcylMFs and/or AcylCFs is preferably a residue obtained by removing hydrogen from the carboxyl group of at least one penta-unsaturated fatty acid selected from the group consisting of bosseopentaenoic acid and eicosapentaenoic acid.

The acyl group in the AcylMFs and/or AcylCFs is preferably a residue obtained by removing hydrogen from the carboxyl group of at least one hexa-unsaturated fatty acid selected from the group consisting of docosahexaenoic acid and nisinic acid.

The acyl group in the AcylMFs and/or AcylCFs is preferably a residue obtained by removing hydrogen from the carboxyl group of at least one aromatic carboxylic acid selected from the group consisting of benzoic acid, phthalic acid, isophthalic acid, terephthalic acid, salicylic acid, gallic acid (3,4,5-trihydroxybenzenecarboxylic acid), and cinnamic acid (3-phenylprop-2-enoic acid).

The acyl group in the AcylMFs and/or AcylCFs is preferably a residue obtained by removing hydrogen from the carboxyl group of at least one dicarboxylic acid selected from the group consisting of oxalic acid, malonic acid, succinic acid, glutaric acid, adipic acid, fumaric acid, and maleic acid.

The acyl group in the AcylMFs and/or AcylCFs is preferably a residue obtained by removing hydrogen from the carboxyl group of at least one amino acid selected from the group consisting of glycine, β-alanine, and ε-aminocaproic acid (6-aminohexanoic acid).

The acyl group in the AcylMFs and/or AcylCFs is preferably a residue obtained by removing hydrogen from the carboxyl group of at least one compound selected from the group consisting of maleimide compounds and phthalimide compounds.

A fiber-reinforced resin composition produced by mixing an AcylMF-containing master batch with a Pd (D) (a matrix), described later, has a high reinforcing effect.

In AcylMFs, it is preferable that the hydroxyl groups present on the surface of MFs be modified with lower acyl.

"Lower" indicates that the carbon number is 1 to 5. When an acyl group (R—CO—) is referred to as "lower acyl," R represents an alkyl group having 1 to 5 carbon atoms. Examples include linear or branched alkyl groups, such as methyl, ethyl, propyl (n-propyl), isopropyl, butyl (n-butyl), isobutyl, tert-butyl, and pentyl (n-pentyl).

From the viewpoint of ease of production and production costs, the AcylMFs are preferably acetylated, microfibrillated plant fibers (AcMFs) in which the acyl is acetyl ($CH_3$—CO—).

The AcylMFs are preferably such that hydroxyl groups of cellulose and hemicellulose (hydroxyl groups of sugar chains) in the raw materials are acylated in such a state that the cellulose crystalline structure present in the raw materials is maintained as much as possible (without being destroyed). By acylation that maintains the cellulose crystalline structure, it is possible to obtain AcylMFs with excellent mechanical properties intrinsic to MFs, improve dispersibility of AcylMFs in a Pd (D), described later, and enhance the reinforcing effect of the AcylMFs on the Pd (D).

The acylation reaction is preferably performed using an anhydride or an acid chloride of a carboxylic acid mentioned above in the presence of a base after suspending the raw materials in an anhydrous aprotic polar solvent capable of swelling the raw materials of plant fibers (CFs or MFs), such as N-methylpyrrolidone (NMP) or N,N-dimethylformamide (DMF). Examples of the base used in this acylation reaction include pyridine, N,N-dimethylaniline, sodium carbonate, sodium hydrogen carbonate, potassium carbonate, and the like.

The acylation reaction is preferably performed, for example, at a temperature in the range of room temperature to 100° C. with stirring.

Degree of Acylation of Acylated, Microfibrillated Plant Fibers (AcylMFs)

The degree of acylation of hydroxyl groups in sugar chains (hydroxyl groups present on the surface in cellulose molecules) of AcylMFs is described below. (The degree of acylation may also be referred to below as "$DS_{acyl}$," "degree of substitution," "degree of modification," or the like.)

The $DS_{acyl}$ of hydroxyl groups in sugar chains of AcylMFs is preferably about 0.05 to 2.5, more preferably about 0.1 to 1.7, and even more preferably about 0.15 to 1.5. The maximum level of the $DS_{acyl}$ is about 2.7, although it depends on the amount of hydroxyl groups in sugar chains of MFs.

Setting the $DS_{acyl}$ to about 0.05 to 2.5 can provide AcylMFs with a moderate crystallinity and solubility parameter (hereinafter may be also referred to as "$SP_{acylmf}$"). For example, acetylated, microfibrillated plant fibers (AcMFs) preferably have a degree of acetylation (hereinafter may be also referred to as "$DS_{ac}$") of about 0.29 to 2.52.

The $DS_{acyl}$ can be analyzed by using various analytical methods, such as elementary analysis, neutralization titration method, FT-IR, and two-dimensional NMR (1H and 13C-NMR).

Crystallinity of AcylMFs

"Crystallinity" refers to the percentage of crystals (mainly cellulose type-I crystals) present in the total cellulose. The AcylMFs preferably have a crystallinity of about 42.7% or more, which is considered to be a high crystallinity, and preferably have a cellulose type-I crystalline structure. The crystallinity of AcylMFs (preferably the degree of cellulose type-I crystals) is preferably about 50% or more, more preferably about 55% or more, even more preferably about 55.6% or more, still even more preferably about 60% or more, and most preferably about 69.5% or more.

The upper limit of the crystallinity of AcylMFs is generally about 80%. The AcylMFs maintain a cellulose type-I crystalline structure and exhibit properties such as high strength and low thermal expansion.

The cellulose type-I crystalline structure is, for example, as defined in "Cellulose no Jiten" (published by Asakura Shoten, new cover, first edition, pages 81 to 86 or 93 to 99). Natural cellulose has a cellulose type-I crystalline structure. In addition, cellulose type-II, type-III, and type-IV crystalline structures are found in cellulose fibers. Among these, the cellulose type-I crystalline structure has a higher crystalline elastic modulus than the other structures.

Since AcylMFs have a cellulose type-I crystalline structure, a fiber-reinforced resin composition containing the AcylMFs and a resin for dilution (D), described later, has a low linear thermal expansion coefficient and high elastic modulus.

The Mfs of AcylMfs can be identified as having a crystalline type-I structure by detecting typical peaks at two regions in the diffraction profile obtained by wide-angle X-ray diffraction image analysis: around 2θ=14 to 17° and around 2θ=22 to 23°.

Although X-ray diffraction and/or solid-state NMR spectroscopy have revealed that cellulose crystals have a variety of crystalline structures, natural cellulose has only a type-I crystalline structure. Due to the extended-chain crystal form of cellulose, the MFs of the AcylMFs have a type-I crystalline structure. Accordingly, a fiber-reinforced resin composition containing the AcylMFs and a Pd (D), described later, has a high elastic modulus and/or high strength, and a low linear thermal expansion coefficient.

The AcylMfs can endure melt-kneading with a resin having a high melting point of 200° C. or higher, and repeated melt-kneading.

(1-2) (B) Thermoplastic Resin (Thermoplastic Resin for Master Batch, Pm)

The master batch of the present invention contains a Pm (B).

The Pm has high affinity for the AcylCFs and AcylMFs. Specifically, the Pm preferably has a solubility parameter (hereinafter also referred to as "SP") similar to the SP of the AcylCFs or AcylMFs ($SP_{acylmf}$: 10 or more). The Pm has an SP ($SP_{pm}$) of 9 to 15.

Examples of preferable Pms include polyvinyl chloride, polystyrene (hereinafter also referred to as "PS"), polyvinylidene chloride, (meth)acryl resins, polyamide (hereinafter also referred to as "PA" or "nylon resin"), polyester, polylactic acid (hereinafter also referred to as "PLA"), polyglycolic acid (hereinafter also referred to as "PGA"), copolymers of lactic acid and ester, an acrylonitrile-butadiene-styrene copolymer (ABS resin), polycarbonate, polyphenylene oxide, (thermoplastic) polyurethane, polyacetal (hereinafter also referred to as "POM"), copolymers of acetal and oxyethylene, vinyl ether resins, cellulose resins (e.g., diacetylated cellulose), and the like.

The Pm is preferably at least one resin selected from the group consisting of PLA, copolymers of lactic acid and glycolic acid, PA, POM, and copolymers of acetal and oxyethylene, from the view point of the mechanical properties, and because these Pms have a SP similar to the SP of the AcylCFs or AcylMFs (i.e., having high affinity for AcylCFs or AcylMFs).

Polylactic Acid (PLA)

Examples of preferable PLA include L-lactic acid (L-PLA), D-lactic acid (D-PLA), DL-lactic acid (DL-PLA), and the like. The PLA preferably has a number average molecular weight (Mn) of about 30,000 or more, and more preferably about 100,000 or more. The upper limit of the number average molecular weight (Mn) of PLA is not particularly limited, and is usually about 1,000,000 or less, and preferably about 500,000 or less.

PLA in which the molar ratio of the L-form and the D-form constituting PLA is adjusted to have any composition of L/D: 100/0 to 0/100 can be used. In PLA with a high elastic modulus, the L-form is preferably present in an amount of 95 mol % or more.

Copolymers of Lactic Acid and Glycolic Acid

As the Pm, it is preferable to use a copolymer of lactic acid and glycolic acid (—(OCH(CH$_3$)CO)$_n$—(OCH$_2$CO))—).

Polyamide (PA)

PA, which has a highly polar amide bond in the molecular structure, has high affinity for cellulose materials.

Examples of preferable PA include aliphatic PA, such as nylon 6 (polyamide 6, PA6), nylon 11 (polyamide 11, PA11), nylon 12 (polyamide 12, PA12), nylon 66 (polyamide 66, PA66), nylon 46 (polyamide 46, PA46), nylon 610 (polyamide 610, PA610), and nylon 612 (polyamide 612, PA612).

Examples of preferable PA include aromatic PA comprising an aromatic diamine, such as phenylene diamine, and an aromatic dicarboxylic acid or a derivative of an aromatic dicarboxylic acid, such as terephthaloyl chloride or isophthaloyl chloride.

Examples of preferable PA include PA6, PA66, PA11, PA12, and the like, which have high affinity for the AcylCFs and AcylMFs, as well as for a resin for dilution (D), described later.

Polyacetal (POM)

Examples of POM (polyoxymethylene) include a homopolymer in which only formaldehyde is polymerized (paraformaldehyde, —(CH$_2$O)$_n$—). Examples of preferable POM include a polymer and a copolymer of trioxane, formaldehyde, ethylene oxide, and the like.

Copolymer of Acetal and Oxyethylene

As the Pm, it is preferable to use a copolymer of paraformaldehyde and about 2 mol % of an oxyethylene unit (—CH$_2$CH$_2$O—), i.e., (—(CH$_2$)$_n$—(CH$_2$CH$_2$O)—), that is, a copolymer of acetal and oxyethylene.

The Pm may be used alone or as a resin mixture of two or more types of Pms.

The Pm is particularly preferably at least one Pm selected from the group consisting of PLA, copolymers of lactic acid and glycolic acid, PA, POM, and copolymers of acetal and oxyethylene.

(1-3) Compatibilizer (Com) (C)

The master batch of the present invention contains a Com (C).

As the Com, it is preferable to use a modified polyolefin, a graft copolymer of a different type of polymer (e.g., PA, polylactic acid (PLA), and polyvinyl acetate (PVAc)), and a polyolefin, or the like, which have high compatibility with a resin for dilution (D) (e.g., PP, PE) described later.

When the Cam is a modified polyolefin, the polyolefin constituting the modified polyolefin is preferably a polymer comprising C$_2$-C$_6$ alkene (olefin). Examples include polyethylene, polypropylene, polybutene, polypentene, polyhexene, and the like.

The modified moiety constituting the modified polyolefin preferably consists of an acid group that is capable of modifying a polyolefin into an anionic polyolefin. For example, an acid group comprising maleic acid anhydride is preferable. Further, the modified moiety constituting the modified polyolefin preferably consists of an unsaturated carboxylic acid, such as acrylic acid or methacrylic acid. As the Com, it is particularly preferable to use a maleic anhydride-modified polypropylene (hereinafter also referred to as "MAPP"), a maleic anhydride-modified polyethylene (hereinafter also referred to as "MAPE"), and the like.

When the Cam is a graft copolymer of a different type of polymer and a polyolefin, examples of the polyolefin constituting the graft copolymer include polyethylene, polypropylene, polybutene, and the like.

Examples of the different type of polymer constituting the graft copolymer include polyamide (PA), polylactic acid (PLA), polyvinyl acetate (PVAc), and the like.

The Com is preferably a polymer that has a cyclic acid anhydride group in the polymer chain. Such a Com can form an ester bond or an amide bond with the hydroxyl groups present in the AcylMFs, and with the hydroxyl groups, amino groups, etc. present in the Pm or Pd, thereby improving the affinity between the AcylMFs, the PR, and the Pd.

The Com may be used alone or in a combination of two or more.

The Com is particularly preferably at least one component selected from the group consisting of MAPP and MAPE.

(1-4) Relationship Between Solubility Parameters (SPs) of Master Batch

The following describes the relationship between the solubility parameters (hereinafter also referred to as "SPs") of the components.

The master batch of the present invention contains AcylMFs (A), a Pm (B), and a Com (C). This master batch is for use in the production of a fiber-reinforced resin composition by mixing with a resin for dilution (Pd) (D). It is important for the AcylMFs (A), the Pm (B), the Com (C), and the Pd (D) to satisfy the following conditions: (a) the AcylMFs (A) have a solubility parameter (hereinafter also referred to as "$SP_{acylmf}$") of 10 or more, (b) the Pm (B) has a solubility parameter (hereinafter also referred to as "$SP_{pm}$") of 9 to 15, and the $SP_{pm}$ is equal to or greater than the solubility parameter of the Pd (D), described later (hereinafter also referred to as "$SP_{pd}$"), and (c) the Com (C) has a solubility parameter (hereinafter also referred to as "$SP_{com}$") equal to or less than the $SP_{acylmf}$ of the AcylMFs (A).

Relationship Between $SP_{acylmf}$ and $SP_{com}$ ((a) and (c) Above)

In the master batch of the present invention, (a) the AcylMFs (A) have an $SP_{acylmf}$ of 10 or more. The $SP_{acylmf}$ of the AcylMFs (A) is preferably within a range of 10 to 15, and more preferably within a range of 12 to 14, since the AcylMFs are satisfactorily dispersed in the master batch and/or in the Pd, which is used for producing a fiber-reinforced resin composition.

Since unmodified cellulose has an SP of 15.65 (unmodified NUKP has an SP of 15.5), it is unlikely that the $SP_{acylmf}$ exceeds 16, and the $SP_{acylmf}$ of the AcylMFs is preferably 15 or less.

Further, in the master batch of the present invention, the Com (C) has an $SP_{com}$ equal to or less than the $SP_{acylmf}$ of the AcylMFs (A). The Com (C) is preferably a component that has affinity for the AcylMFs, PR, and Pd, and the numerical range of the $SP_{com}$ of the Com is not particularly limited. The numerical range of the $SP_{com}$ of the Com is preferably equal to or less than the $SP_{acylmf}$ of the AcylMFs and between the $SP_{pm}$ of the Pm and the $SP_{pd}$ of the Pd. For example, when the Pd is hydrophobic (when the Pd has an $SP_{pd}$ of 9 or less), the Com preferably has an $SP_{com}$ of 8 to 9.

In this manner, in the master batch of the present invention, the $SP_{acylmf}$ of the AcylMFs (A) and the $SP_{com}$ of the Com (C) are adjusted. When the range of the $SP_{acylmf}$ of the AcylMFs (A) is determined, the Com (C) is selected in view of the relationship between the $SP_{acylmf}$ of the AcylMFs (A) and the $SP_{com}$ of the Com (C).

In the present invention, this procedure achieves a suitable combination of each component in the master batch or in a fiber-reinforced resin composition, enabling the production of a fiber-reinforced resin composition with excellent mechanical properties.

Further, when a hydrophobic polyolefin, such as PP or PE, is used as the Pd, the Com, such as MAPP, is used for the purpose of improving its adhesion and/or dispersibility. The $SP_{com}$ of the Com, such as MAPP, is about 8.1 to 8.4, although it depends on the amount of acid added.

Method of Calculating $SP_{acylmf}$ of AcylMFs

The AcylCFs (e.g., acylated ligno pulp) and/or AcylMFs are stable at a melt-kneading temperature in the method for producing a master batch of the present invention described later, and they do not easily decompose. Thus, the solubility parameter of the AcylCFs used in the production of a master batch can be considered to be the solubility parameter ($SP_{acylmf}$) of the AcylMFs in the master batch.

The SP value of acylated ligno pulp can be calculated by using the Fedors SP value calculation method with the cellulose and acetyl cellulose SP values disclosed in the literature. This value can serve as the $SP_{acylmf}$ of the AcylMFs.

A specific method of calculating the SP of acetylated ligno pulp is described below in the "Sample, Test Material, and Method of Preparing Them" section in the Examples.

Further, the $SP_{acylmf}$ of AcylCFs modified with acyl other than acetyl (e.g., acylated ligno pulp) and/or AcylMFs (e.g., hexanoylated lignocellulose) can also be calculated as in this method.

Relationship Between $SP_{pm}$ and $SP_{pd}$ ((b) Above)

In the master batch of the present invention, (b) the Pm (B) has an $SP_{pm}$ of 9 to 15. The $SP_{pm}$ of the Pm (B) is within a range of 9 to 15, and preferably within a range of 9 to 14, in view of the affinity for AcylMFs and, moreover, the applicability to a hydrophobic resin for dilution.

In the master batch of the present invention, the $SP_{pm}$ is determined, in addition to the $SP_{acylmf}$ and the $SP_{com}$, whereby a fiber-reinforced resin composition with sufficiently high strength can be produced even when a resin for dilution that is much more hydrophobic than the Pm (a Pd having a low $SP_{pd}$) is used, together with a Pd that has an $SP_{pd}$ the same as or similar to the $SP_{pm}$.

In terms of a previously known master batch, the Pm and Pd used in combination preferably have a similar degree of hydrophobicity to each other. More specifically, in a previously known master batch, the $SP_{pd}$ of the Pd and the $SP_{pm}$ of the Pm are preferably similar values (or the same value). In contrast, in the master batch of the present invention, the $SP_{pd}$ of the Pd and the $SP_{pm}$ of the Pm can of course be similar values (or the same value), and can also be values that greatly differ from each other.

Specifically, the master batch of the present invention, in which the $SP_{acylmf}$, $SP_{pm}$, and $SP_{com}$ values are specified, is highly versatile and is applicable to resins (Pds) with various $SP_{pd}$ values.

Accordingly, when the master batch containing the Pm is used to produce a fiber-reinforced resin composition, a Pd is selected according to the purpose of use of the resulting fiber-reinforced resin composition to adjust the relationship between the $SP_{pm}$ of the Pm and the $SP_{pd}$ of the Pd to achieve a suitable combination of each component, thus producing a fiber-reinforced resin composition with excellent mechanical properties.

The Pm and the Pd used for a fiber-reinforced resin composite can be selected according to its suitable applications.

When the resin for dilution (Pd) (D) used for a fiber-reinforced resin composition is polypropylene (PP), polyethylene (PE), polystyrene (PS), etc., which have low polarity, the $SP_{pd}$ is as low as about 8.0 to 8.1.

The SP ($SP_{pm}$ or $SP_{pd}$) of PAs, which are frequently used in automobile components, such as engine covers and manifolds, and household appliance components, is about 9 to 14, although it depends on the polymerization raw materials.

The SP ($SP_{pm}$ or $SP_{pd}$) of PA6 is about 12.2.

Further, the SP ($SP_{pm}$ or $SP_{pd}$) of PA12 is about 9.3.

The SP ($SP_{pm}$ or $SP_{pd}$) of POM, which is frequently used for housing, casing, and mechanism elements of electric and electronic products, for which strength is required, is about 11.1.

The $SP_{pm}$ of PLA is about 11.4.

When a polar material, such as PA or POM, which has a high $SP_{pm}$, is used, acylation (or acetylation) treatment to achieve a $DS_{acyl}$ (or $DS_{ac}$) of about 1.2 sufficiently improves the compatibility with cellulose. Maintaining the strength of cellulose fibers at a high level can increase the flexural properties of the fiber-reinforced resin composition.

The use of PA, POM, PLA, etc. as the Pm and/or Pd with addition of the AcylMFs can produce a fiber-reinforced resin material with excellent flexural properties.

The ranges of the $SP_{pm}$ of the Pm and/or the $SP_{pd}$ of the Pd are specific to each resin.

The technical feature of the master batch of the present invention lies in that it contains selected AcylMFs (A), Pm (B), and Com (C), each having a specific solubility parameter (SP). Further, the technical feature of the fiber-reinforced resin composition lies in that it further contains a combination of the master batch with a selected Pd (D) having a specific solubility parameter (SP).

The master batch of the present invention is a technique that has enabled application to a Pd having a solubility parameter ($SP_{pd}$) greatly different from the SP ($SP_{pm}$) of the Pm.

The present invention provides a technique in relation to a master batch that is highly versatile and is flexibly applicable to combinations of components, including a PD that has any range of $SP_{pd}$, to produce a fiber-reinforced resin composition. The master batch of the present invention can be used with various types of Pds.

(1-5) Formulation of Master Batch

The master batch of the present invention is used for producing a fiber-reinforced resin composition by mixing with a PD (D). The master batch contains AcylMFs (A), a Pm (B), and a Com (C).

The content of AcylMFs (A) in the master batch is preferably about 20 to 70 mass %, and more preferably about 30 to 60 mass %.

The content of Pm (B) in the master batch is preferably about 10 to 60 mass %, and more preferably about 15 to 50 mass %.

The content of Com (C) in the master batch is preferably about 10 to 30 mass %, and more preferably about 15 to 25 mass %.

The AcylMFs are lightweight and strong, and have a low linear thermal expansion coefficient, like plant fibers. The use of this master batch enables the production of a fiber-reinforced resin composition with excellent properties, such as mechanical properties, heat resistance, low thermal expansion, and heat stability. The use of the master batch of the present invention enables performing well-balanced improvement in mechanical properties, such as static properties measured with a flexure test etc., and dynamic properties measured with an impact test etc.

This fiber-reinforced resin composition has a property of being softened upon heating so that it is easily molded, and a property of returning to a solid again upon cooling (thermoplasticity), like the properties of general-purpose plastic; thus, the fiber-reinforced resin composition exhibits excellent processability.

The master batch of the present invention contains AcylMFs (A) and a Com (C). In the master batch of the present invention, the AcylMFs (A) are uniformly dispersed in the Pm (B) since agglomeration of the AcylMFs (A) caused by hydrogen bonding is inhibited in the Pm (B) (a matrix material) in the mixing step of the AcylMFs (A) and the Pm (B).

The master batch of the present invention is suitably used for producing a fiber-reinforced resin composition when a highly hydrophobic resin is used as the Pd.

(2) Fiber-Reinforced Resin Composition

The fiber-reinforced resin composition of the present invention contains the master batch containing the AcylMFs (A), the Pm (B), and the Com (C), as well as a resin for dilution (Pd) (D).

The AcylMFs are lightweight and strong, and have a low linear thermal expansion coefficient, like plant fibers. A fiber-reinforced resin composition produced using the AcylMF-containing master batch has a property of being softened upon heating so that it is easily molded and has a property of returning to a solid again upon cooling (thermoplasticity), like the properties of general-purpose plastic.

The fiber-reinforced resin composition exhibits excellent processability.

(2-1) Resin for Dilution (Pd) (D)

The fiber-reinforced resin composition of the present invention contains the master batch and the Pd (D).

As the Pd, it is preferable to use polyethylene (hereinafter also referred to as "PE"), polypropylene (hereinafter also referred to as "PP"), ethylene-propylene copolymers, polyisobutylene (hereinafter also referred to as "PIB"), polyisoprene (hereinafter also referred to as "IR"), polybutadiene (hereinafter also referred to as "BR"), polyvinyl chloride, polystyrene (PS), polyvinylidene chloride, fluororesin, (meth)acryl resins, polyamide (PA, nylon resin), polyester, polylactic acid (PLA), polyglycolic acid (PGA), a copolymer resin of lactic acid and ester, an acrylonitrile-butadiene-styrene copolymer (ABS resin), polycarbonate, polyphenylene oxide, (thermoplastic) polyurethane, polyacetal (PCM), vinyl ether resins, polysulfone resins, cellulose resins (e.g., triacetylated cellulose, diacetylated cellulose), and the like.

As the Pd, in particular, it is preferable to use at least one resin selected from the group consisting of PE, PP, ethylene-propylene copolymers, PIB, IR, and BR since they have excellent properties, such as mechanical properties, impact resistance, and versatility, and since they are inexpensive.

PP and/or PE (in particular, high-density polyethylene: HDPE), which are versatile as structural members, are suitably used as the Pd. Moreover, PP and/or PE is highly compatible with the Com, such as MAPP, contained in the master batch, and is thus suitably used as the Pd.

The Pd may be used alone or as a resin mixture of two or more types.

(2-2) Relationship Between Solubility Parameters (SPs) of Fiber-Reinforced Resin Composition As described above, in terms of the master batch used as a raw material of the fiber-reinforced resin composition, the AcylMFs (A), the Pm (B), the Com (C), and a Pd (D) satisfy the following conditions:

(a) the AcylMFs (A) have an $SP_{acylmf}$ of 10 or more;
(b) the Pm (B) has an $SP_{pm}$ of 9 to 15, and the $SP_{pm}$ is equal to or greater than the $SP_{pd}$ of a Pd (D); and
(c) the Com (C) has an $SP_{com}$ equal to or less than the $SP_{acylmf}$ of the AcylMFs (A).

In the fiber-reinforced resin composition, the $SP_{pm}$ of the Pm (B) is equal to or greater than the $SP_{pd}$ of the Pd (D), and the $SP_{pm}$ of the Pm (B) is 9 to 15. That is, in relation to the Pm (B) (i.e., 9 to 15) in the fiber-reinforced resin composition, the $SP_{pd}$ of the Pd (D) is equal to or less than the $SP_{pm}$ of Pm (B).

The Pm (B) and/or Pd (D) used for the fiber-reinforced resin composite is selected according to the usage of the fiber-reinforced composite.

PP, which has a small specific gravity, is a hydrophobic resin, and is frequently used for automobile components, electric household appliance components, packaging films, and food containers, has an $SP_{pd}$ of about 8.1.

The AcylMFs contained in the master batch of the present invention are sufficiently dispersed even in a resin for dilution (Pd), such as PP, which has a low $SP_{pd}$, thereby increasing the strength of the fiber-reinforced resin composition (molded article).

The addition of the AcylMF-containing master batch of the present invention to a Pd having a low $SP_{pd}$, such as PP ($SP_{pd}$=8.1), PS ($SP_{pd}$=8.85), or ($SP_{pd}$=8.0), can improve the flexural properties of the fiber-reinforced resin composition (molded article).

Nonpolar materials, such as PP, have a low $SP_{pd}$; thus, the use of AcylMFs that have a higher degree of acylation (more hydrophobic AcylMFs) is preferable.

(2-3) Formulation of Fiber-Reinforced Resin Composition

The fiber-reinforced resin composition of the present invention is obtained by diluting the master batch containing the AcylMFs (A), the Pm (B), and the Com (C) with a Pd (D); thus, as resins, the fiber-reinforced resin composition contains the Pm from the master batch and the Pd.

The fiber-reinforced resin composition contains the Pm from the master batch in an amount of preferably about 2 to 30 mass %, and more preferably about 4 to 20 mass %.

The fiber-reinforced resin composition contains the Pd in an amount of preferably about 65 to 85 mass %, and more preferably about 70 to 80 mass %.

The fiber-reinforced resin composition of the present invention may further contain, for example, the following additives: surfactants; polysaccharides, such as starch and alginic acid; natural proteins, such as gelatin, glue, and casein; inorganic compounds, such as tannin, zeolite, ceramics, and metal powder; colorants; plasticizers; flavoring agents; pigments; flow-regulating agents; leveling agents; conducting agents; antistatic agents; UV absorbers; UV dispersers; deodorants; antioxidants; and the like. The amount of such optional additives may be suitably selected from such a range that the effect of the present invention is not impaired.

(3) Method for Producing a Master Batch

Production Method 1

The method of the present invention for producing a master batch containing AcylMFs (A), a Pm (B), and a Com (C), the master batch being for use in the production of a fiber-reinforced resin composition by mixing with a Pd (D), comprises the following step of:

melt-kneading acylated plant fibers (A') (hereinafter also referred to as "AcylCFs") as a raw material of AcylMFs (A), a Pm (B), and a Com (C) to defibrate the AcylCFs (A') in the melt-kneaded product while melt-kneading, wherein the following conditions are satisfied:

(a) the AcylMFs (A) have an $SP_{acylmf}$ of 10 or more, (b) the Pm (B) has an $SP_{pm}$ of 9 to 15, and the $SP_{pm}$ is equal to or greater than the $SP_{pd}$ of the Pd (D), and (c) the Com (C) has an $SP_{com}$ equal to or less than the $SP_{acylmf}$ of the AcylMFs (A).

When each component has a specific solubility parameter (SP), the master batch of the present invention can be produced by (1) defibrating AcylCFs (A') as a raw material of AcylMFs (A) in a melt-kneaded product while melt-kneading the AcylCFs (A'), a Pm (B), and a Com (C).

In the production method of the present invention, the kneading treatment and/or the mixing treatment is also referred to as "compositing."

According to the production method of the present invention, the AcylCFs (A'), which are a raw material of the AcylMFs (A), the Pm (B), and the Com (C), each having a specific solubility parameter (SP), are melt-kneaded using a kneading machine or the like, and the AcylCFs (A') are defibrated into AcylMFs (A) by the shear stress during the kneading; in this manner, a master batch is obtained.

The technical feature of the method for producing a master batch of the present invention lies in that the AcylMFs (A), the Pm (B), and the Com (C), each having a specific solubility parameter (SP), are selected and melt-kneaded. Further, the technical feature of the method for producing a fiber-reinforced resin composition lies in that the thus-obtained master batch is used in combined with a Pd (D) having a specific solubility parameter (SP).

In the master batch of the present invention, microfibrillation of the AcylCFs (A') is facilitated; thus, when the master batch of the present invention is diluted with the Pd (D), a fiber-reinforced resin composition is obtained in which the AcylMFs (A) is dispersed in the Pd (D).

When melt-kneading is performed by adding the Com (C) and the Pm (B) to the AcylMFs (A) or the AcylCFs (A'), all of the components may be mixed at room temperature without heating, and then be melt-kneaded; or all of the components may be melt-kneaded while being mixed with heating.

Production Method 2

The method of the present invention for producing a master batch containing AcylMFs (A), a Pm (B), and a Com (C), the master batch being for use in the production of a fiber-reinforced resin composition by mixing with a resin for dilution (D), has a feature in that it comprises the steps of:

(1) melt-kneading acylated plant fibers (AcylCFs) (A') as a raw material of AcylMFs (A) and a Pm (B) to defibrate the AcylCFs (A') in the melt-kneaded product while melt-kneading to obtain a melt-kneaded product containing the AcylMFs (A), wherein the following conditions are satisfied:

(a) the AcylMFs (A) have an $SP_{acylmf}$ of 10 or more; and (b) the Pm (B) has an $SP_{pm}$ of 9 to 15, and the $SP_{pm}$ is equal to or greater than the $SP_{pd}$ of the Pd (D), and (2) adding a Com (C) to the melt-kneaded product containing the AcylMfs (A) obtained in step (1) to further perform melt-kneading, wherein the following condition is satisfied:

(c) the Com (C) has an $SP_{com}$ equal to or less than the $SP_{acylmf}$ of the AcylMFs (A).

A molded article produced by using the master batch obtained as in Production Method 2, which comprises step (2) of adding the Com to the melt-kneaded product containing AcylMFs (A) obtained in step (1) to further perform melt-kneading, has higher strength than a molded article produced using the master batch produced by Production Method 1.

Melt-Kneading Temperature, Kneading Machine, Etc.

The melt-kneading temperature can be adjusted based on the Pm (B) to be used.

The heating temperature is preferably set to within about ±10° C. from the lowest processing temperature recommended by thermoplastic resin suppliers (225 to 240° C. for PA6, 170 to 190° C. for PCM, 160 to 180° C. for PP and MAPP).

When the heating temperature (mixing temperature) at the time of melt-kneading is set to within this range, the AcylMFs (A) or the AcylCFs (A'), and the Pm (B) can be uniformly mixed.

For melt-kneading, a kneading method using a kneading machine, such as a bench roll, a Banbury mixer, a kneader, or a planetary mixer, a mixing method using agitating blades, a mixing method using a revolution or rotation agitator, or the like is preferably used to mix the components.

In the method for producing the master batch, hydrogen bonding of cellulose is inhibited by introducing lower acyl (lower alkanoyl), such as acetyl, into hydroxyl groups in sugar chains constituting MFs.

The AcylCFs, such as acylated pulp, have a fiber diameter of several tens to several hundreds of micrometers.

According to the method for producing a master batch of the present invention, the AcylMFs (AcMFs) can be defibrated to a fiber diameter of about 4 to 200 nm in the step of melt-kneading (melt-mixing) of the AcylMFs (AcMFs) and the resins (Pm and/or Pd). The chemical modification treatment, such as acylation (or acetylation), is performed simply at low cost and can be easily put into practical use.

That is, the chemical modification treatment improves the dispersibility of chemically modified cellulose fibers in a resin and also facilitates defibration (microfibrillation).

In the present invention, some of the hydroxyl groups present in the cellulose molecules are acylated (e.g., replaced with acetyl groups), whereby a master batch or fiber-reinforced resin composition having a solubility parameter (SP) optimum to each resin can be obtained.

In the master batch and/or fiber-reinforced resin composition, the AcylMFs are well dispersed in the resins (the Pm or Pd), and cellulose exerts an improved reinforcing effect on the resins; therefore, it is possible to produce a composite material with excellent mechanical properties.

In general, AcylMFs can be produced by mechanically defibrating pulp or the like using a high-pressure homogenizer or the like. However, since a slurry containing pulp at a low concentration is used, and the equipment used is expensive and large, CNFs produced thereby are expensive.

In the production step according to the present invention, undefibrated pulp is chemically modified (AcylCFs (A')), which are the raw material of the AcylMFs (A)), and defibration is performed by the shear stress of a thermal melting mixer while compositing is performed with a resin (the Pm (B) or the Pd (D)). Therefore, it is possible to reduce the production costs and obtain a high-performance fiber-reinforced resin composition in which less-damaged AcylMFs are dispersed.

Previously Known Method for Producing a Master Batch

The following methods A and B are previously known methods for producing a master batch.

Method A

A method for producing a master batch, comprising the steps of:
(i) defibrating plant fibers (CFs) to produce MFs;
(ii) acylating the MFs to produce AcylMFs; and
(iii) melt-kneading the AcylMFs, a Pm, and a Com.

Method B A method for producing a master batch, comprising:
(i)' acylating plant fibers (CFs) to produce acylated plant fibers (AcylCFs);
(ii)' defibrating the AcylCFs to produce AcylMFs; and
(iii)' melt-kneading the AcylMFs, a Pm, and a Com.

For method A above, step (i) requires defibration of a large volume of a pulp slurry, followed by concentration of a large volume of the defibrated pulp slurry, and additionally, step (ii) requires chemical modification. Thus, the costs for producing the master batch are likely to increase in terms of the equipment costs and the costs for the production process. Further, method B requires a step of defibration of the acylated plant fibers to produce AcylMFs.

Unlike the previously known methods for producing a master batch, the method for producing a master batch of the present invention does not require defibration of a large volume of a pulp slurry, concentration of a large volume of the defibrated pulp slurry, chemical modification, or the like, and nowhere requires a special step of defibrating AcylCFs to produce AcylMFs.

Therefore, the method for producing a master batch of the present invention can produce a master batch with a simple device.

Moreover, the AcylMF-containing master batch of the present invention is substantially applicable to any Pds, ranging from nonpolar Pds to polar Pds (matrix materials); thus, the use of this master batch enables the production of a highly efficient fiber-reinforced resin composition.

(4) Method for Producing a Fiber-Reinforced Resin Composition

As described above, the fiber-reinforced resin composition of the present invention can be produced by diluting the master batch containing the AcylMFs (A), the Pm (B), and the Com (C) with a Pd (D).

The fiber-reinforced resin composition of the present invention is preferably produced by using a production method comprising the steps of:

(1) adding a Pd (D) to the master batch to perform melt-kneading; and
(2) further adding a Pd (D) to the melt-kneaded product obtained in step (1) to perform melt-kneading.

The above method for producing a fiber-reinforced resin composition has a feature in that the master batch of the present invention is diluted with a resin for dilution (Pd) through two steps. This method is capable of producing a molded article with sufficient strength even when the amount of the Pm contained in the master batch is decreased to about 4 wt % of the entire fiber-reinforced resin composition.

(5) Molding Material and Molded Article Obtained by Using the Fiber-Reinforced Resin Composition The fiber-reinforced resin composition of the present invention has excellent properties, such as mechanical properties, heat resistance, low thermal expansion, and heat stability. The use of the fiber-reinforced resin composition of the present invention enables performing well-balanced improvement in mechanical properties, such as static properties measured with a flexure test etc., and dynamic properties measured with an impact test etc.

The molded article of the present invention comprising the fiber-reinforced resin composition having such excellent properties also has the same excellent properties.

The molded article may be formed into any of various shapes, such as films, sheets, plates, pellets, powders, and three-dimensional configurations. Examples of usable molding methods include metallic molding, injection molding, extrusion molding, blow molding, foam molding, and the like.

The molded article can be used not only in the field of fiber-reinforced plastics, in which matrix moldings containing plant fibers are used, but also in fields in which thermoplasticity and mechanical strength (e.g., tensile strength) are required.

The fiber-reinforced resin composition and the molded article obtained by using the master batch of the present invention are lightweight and have high strength. Therefore, according to the present invention, it is possible to produce a fiber-reinforced resin composition, and articles molded with it, while saving more energy, compared to known materials for carbon fiber-reinforced resin compositions, glass fiber-reinforced resin compositions, metal-containing compositions, and articles molded with these compositions.

The fiber-reinforced resin composition obtained by using the master batch of the present invention, and the articles molded with it (molding material and molded article) can be effectively used for interior materials, exterior materials, structural materials, etc. of transportation vehicles, such as automobiles, trains, ships, and airplanes; housings, structural materials, internal parts, etc. of electrical appliances such as computers, televisions, telephones, and watches; housings, structural materials, internal parts, etc. of mobile communication devices, such as mobile phones; housings, structural materials, internal parts, etc. of devices such as portable music players, video players, printers, copiers, and sporting equipment; building materials; office supplies such as writing supplies; tanks; containers, and the like.

The application of the technique of the present invention to vehicles, airplanes, ships, and the like can improve the fuel efficiency of transportation vehicles and reduce transportation costs. Further, the application of the technique of the present invention to building materials also enables construction of buildings that are highly resistant to earthquakes.

EXAMPLES

The following describes the present invention in more detail with reference to Examples and Comparative Examples. The present invention is not limited to these Examples.

I. Test Method, Measurement Method, and Instruments for Use

The test methods used in the Examples and Comparative Examples are as follows.

(1) Lignin Quantification Method (Klason Lignin Method)

A glass fiber filter paper (GA55) was dried in a 110° C. oven to a constant weight. After the filter paper was allowed to cool in a desiccator, the weight was measured.

A sample of plant fibers completely dried at 110° C. (about 0.2 g) was precisely weighed and placed in a 50-mL-volume tube, and 3 mL of 72% concentrated sulfuric acid was added. While the content in the tube was crushed with a glass rod to make a uniform mixture, the tube was placed in 30° C. warm water to warm the tube for 1 hour. Subsequently, after the tube content and 84 g of distilled water were poured into an Erlenmeyer flask and mixed, the mixture was allowed to react in an autoclave at 120° C. for 1 hour.

After being cooled, the content (the sample of plant fibers) was filtered through a glass fiber filter paper to remove the insoluble matter, and the filtrate was washed with 200 ml of distilled water. The washed product was dried in a 110° C. oven to a constant weight and weighed.

(2) Analysis of Sugar Component of Plant Fiber (Pulp)

A glass fiber filter paper (GA55) was dried in a 110° C. oven to a constant weight. After the filter paper was allowed to cool in a desiccator, the weight was measured.

A sample of plant fibers completely dried at 110° C. (about 0.2 g) was precisely weighed and placed in a 50-mL-volume tube, and 3 mL of 72% concentrated sulfuric acid was added. While the content in the tube was crushed with a glass rod to make a uniform mixture, the tube was placed in 30° C. warm water to warm the tube for 1 hour. Subsequently, after the tube content and 84 g of distilled water were quantitatively poured into an Erlenmeyer flask and mixed, 1.0 mL of the mixture was placed in a pressure tube, and 100 μL of a 0.2% inositol solution was added as an internal standard. Using a measuring pipette, 72% concentrated sulfuric acid (7.5 μL) was added thereto. A reaction was allowed to proceed at 120° C. for 1 hour.

After the reaction mixture (the sample of plant fibers) was cooled, 100 μL of the reaction mixture was diluted with ultrapure water, and then subjected to ion chromatography (Thermo Fisher Scientific Inc.) to analyze the sugar components in the sample of plant fibers.

(3) Method for Determining the Degree of Chemical Modification (DS) in Chemically Modified Plant Fiber Measurement of DS by Back Titration Method A method for measuring the DS of a sample of acylated (esterified) plant fibers is explained below with reference to an acetylated sample, simply for an example. The explanation also applies to other samples of plant fibers that have been subjected to acylation other than acetylation.

Weighing and Hydrolysis

A sample was dried, and 0.5 g of the sample (A) was precisely weighed. After 75 mL of ethanol and 50 mL (0.025 mol) of 0.5N NaOH (B) were added thereto, the mixture was stirred for 3 to 4 hours. The resulting mixture was filtered, washed with water, and dried. The sample on filter paper was subjected to an FT-IR measurement. Absorption peaks based on the carbonyl of ester bonds were confirmed to have disappeared; that is, ester bonds were confirmed to have been hydrolyzed.

This filtrate was used for the back titration described below.

Back Titration

The filtrate contained a sodium acetate salt resulting from hydrolysis and an excess of added NaOH. The neutralization titration of this NaOH was performed using IN HCl (and phenolphthalein for the indicator).

The number of moles (D) of cellulose repeating units was calculated by using the following formulas:

0.025 mol $(B)$−(Number of moles of HCl used for neutralization)=Number of moles of acetyl groups esterified to hydroxyl groups of cellulose etc. $(C)$ (Molecular weight of cellulose repeating units 162× Number of moles of cellulose repeating units (undetermined $(D)$)+(Molecular weight of acetyl groups 43×$(C)$)=0.5 g of the weighed sample $(A)$ DS is calculated by using the following equation:

$$DS=(C)/(D)$$

Method for Measuring DS Using Infrared (IR) Absorption Spectrum

The DS of esterified cellulose/lignocellulose can also be determined by measuring infrared (IR) absorption spectra.

When cellulose/lignocellulose is esterified, an intense absorption band derived from ester carbonyl (C=O) appears around 1733 cm$^{-1}$. First, a calibration curve is prepared by plotting the intensity of this absorption band (area) on the horizontal axis and plotting the DS value determined by using the back titration method described above on the horizontal axis. The DS value of the sample of plant fibers is obtained by measuring the intensity of the absorption band, and determining the DS of the sample from this value and the calibration curve.

In this way, the DS can be determined quickly and simply.

(4) Measurement of Moisture Content in Fiber Solids

The moisture content in fiber solids was measured with an infrared moisture meter (FD-720, produced by Kett Electric Laboratory).

(5) Preparation of Test Specimen and Tensile Characteristic Test Method

A dumbbell-shaped test specimen was prepared by adding a powdery or pellet-formed test composition to an injection molder (NPX7-1F produced by Nissei Plastic Industrial Co., Ltd.), and molding a dumbbell-shaped molded article (thickness: 1 am, parallel portion length: 38 mm) at a heating cylinder temperature of 190° C. (230° C. when PA6 is contained) and a mold temperature of 40° C.

This dumbbell-shaped test specimen was measured for the tensile strength and automatic Young's modulus with a universal tester (Instron 3365 tester produced by Instron Japan Company, Ltd.) at a test rate of 10 mm/min with the gauge length being 25 mm.

In this specification, "automatic Young's modulus" is referred to as "tensile elastic modulus" or simply "elastic modulus."

(6) Measurement of Defibration of Fiber in Fiber-Containing Resin Composition

Observation was performed with a transmission electron microscope (TEM).

Most of the acylated, microfibrillated plant fibers (AcylMF) in a molded article are oriented in the same direction as the molding direction (the flowing direction of an AcylMF-containing resin composition) during injection molding. Thus, observing a molded article in the same direction as the molding direction gives a view of the cross-sectional surface of AcylMF. As described below, samples were prepared and observed with a transmission electron microscope (TEM) to evaluate the fiber diameter and the degree of defibration.

A portion of an injection molded article was cut out and embedded in epoxy resin such that the portion can be observed from the flowing direction, followed by trimming with the shear domain being left. Subsequently, the trimmed sample and ruthenium tetroxide (staining reagent) were placed in a sealable reagent bottle and hermetically sealed, followed by staining fixation with heating.

Subsequently, a diamond knife (produced by DiATOME) was attached to an ultramicrotome (UCT produced by Leica Microsystems), and a 100-nm-thick ultra-thin specimen was prepared. The specimen was observed with an electronic microscope (JEMI1400 Plus produced by JEOL Ltd.) at an accelerating voltage of 120 Kv.

The longitudinal section of black-stained AcylMF can be observed, and the fiber diameter and the degree of defibration can be evaluated.

(7) Kneader and Operating Conditions for Use in Production of Master Batch and Resin Composition KZW15TW-45MG twin-screw kneader produced by Technovel Corporation Screw Diameter: 15 am, L/D: 45

Dam Structure: None, treatment rate: 160 g/hr

This kneader was operated by changing the kneading temperature and the screw temperature depending on the kneaded product.

The kneader was operated at a screw rotation of typically 200 rpm (circumferential velocity: 9,425 mm/min).

The kneader was operated at 400 rpm (circumferential velocity: 18,850 mm/min) for high-speed rotation.

The kneading temperature was adjusted depending on the type of resin used.

Resin for Use in Master Batch

PA6: kneaded at a temperature of 200 to 220° C.

POM, PP, and PLA: each kneaded at a temperature of 170 to 180° C.

PE: kneaded at a temperature of 140° C.

II. Sample, Test Material, and Method of Preparing Them (1) Refiner-Treated Plant Fibers
(1-1) Refiner-Treated Needle-Bleached Kraft Pulp (NBKP)

Defibration treatment was performed such that a slurry of NBKP (obtained from Oji Holdings Corporation) (an aqueous suspension with a pulp slurry concentration of 3 mass %) was passed through a single-disc refiner (produced by Aikawa Iron Works Co., Ltd.) and repeatedly subjected to refiner treatment until a Canadian Standard Freeness (CSF) value of 50 mL was achieved. This NBKP, which had been subjected to defibration treatment, was used in the following Examples.

Observation of Fiber with scanning Electron Microscope (SEM)

Although fibers with a diameter on a submicron order were observed in the NBKP that had been subjected to defibration treatment, plant fibers with a coarse fiber diameter of several tens to several hundreds of micrometers were also sporadically observed.

Component Composition Analysis Results (Unit for Values: Mass %)

The NBKP that had been subjected to defibration treatment contained cellulose (84.3), glucomannan (7.9), xylan (6.9), arabinan (0.5), galactan (0.3), and lignin (0.1).

(1-2) Refiner-Treated Needle-Unbleached Kraft Pulp (NUKP)

Two types of NUKP were used. These two types of NUKP were slightly different in their component composition due to the difference in production lots.

Defibration treatment was performed such that a slurry of NUKP (obtained from Nippon Paper Industries Co., Ltd.) (an aqueous suspension with a pulp slurry concentration of 3 mass %) was passed through a single-disc refiner (produced by Aikawa Iron Works Co., Ltd.) and repeatedly subjected to refiner treatment until a Canadian Standard Freeness (CSF) value of 50 mL was achieved. This NUKP, which had been subjected to defibration treatment, was used in the following Examples.

Results of Observation of Fiber with Scanning Electron Microscope (SEM)

Although fibers with a diameter on a submicron order were observed in the NUKP that had been subjected to defibration treatment, many fibers with a coarse fiber diameter of several tens to several hundreds of micrometers were also observed.

Component Composition Analysis Results of NUKP (1)(unit for values: mass %)

The NUKP that had been subjected to defibration treatment contained cellulose (83.6), glucomannan (7.2), xylan (6.5), arabinogalactan (0.7), and lignin (2.0).

Component Composition Analysis Results of NUKP (2) (unit for values: mass %)

The NUKP that had been subjected to defibration treatment contained cellulose (85.9), glucomannan (3.6), xylan (6.9), arabinogalactan (0.7), and lignin (2.9).

(2) Acylated Plant Fibers

The refiner-treated plant fibers were subjected to acylation treatment.

Preparation of Acetylated NUKP (2) (AcNUKP (2))

9.0 kg of N-methylpyrrolidone (NMP) was added to 8.6 kg of water-containing NUKP (2)(refiner-treated) (solids content: 3.0 kg), and the mixture was placed in a triple-blade planetary mixer (Trimix TX-50 produced by Inoue Mfg., Inc.), followed by stirring. The mixture was dehydrated at 60 to 70° C. under reduced pressure. Subsequently, 3.7 kg of acetic anhydride and 0.5 kg of potassium carbonate were added thereto, and the mixture was allowed to react at 70° C. for 3 hours. After the reaction, the reaction product was washed sequentially with ethanol (EtOH) and water, and solvent substitution was further performed with EtOH, thereby preparing EtOH-containing acetylated plant fibers (acetylated NUKP (2), or abbreviated to AcNUKP (2)).

Subsequently, EtOH-containing (acetylated) AcNUKP (2) was placed in the triple-blade planetary mixer and dried at 60 to 70° C. under reduced pressure. The moisture content of the obtained AcNUKP (2) was measured with an infrared moisture meter. The moisture content was 97.7 wt %.

The degree of substitution (DS) of acetyl groups of AcNUKP (2) was 0.97.

Preparation of Acetylated NUKP (1)(AcNUKP (1))

Acetylated NUKP (1) was prepared in accordance with the preparation method for AcNUKP (2).

The degree of substitution (DS) of acetyl groups of AcNUKP (1) was 0.81. :DS

Preparation of Acetylated NBKP (AcNBKP)

The following AcNBKP with different degrees of substitution (DS) were prepared in accordance with the preparation method for AcNUKP (2) by changing the molar ratio of acetic anhydride and potassium carbonate to NUKP.

The following shows the reaction conditions. The amount of acetic anhydride and potassium carbonate for use is indicated with a molar ratio (molar equivalent) to the molar number of hydroxyl groups of the cellulose repeating units that is calculated based on the assumption that NBKP is entirely composed of cellulose.

TABLE 1

Preparation Conditions for AcNBKP

| DS of AcNBKP | The Amount of Acetic Anhydride (Molar Equivalent) | The Amount of Potassium Carbonate (Molar Equivalent) | Reaction Temperature (° C.) | Reaction Time (min) |
|---|---|---|---|---|
| 1.01 | 1.14 | 0.45 | 80 | 90 |
| 1.57 | 1.80 | 0.70 | 80 | 100 |
| 2.52 | 3.50 | 1.20 | 80 | 60 |

(3) Calculation of Solubility Parameter (SP) (Unit: $(cal/cm^3)^{1/2}$) of Chemically Modified Plant Fiber (Ligno Pulp)

The following describes how to determine SP value (Y) of an acetylated form of ligno pulp composed of cellulose, hemicellulose (which is composed of glucomannan, xylan, and arabinogalactan), and lignin, the degree of substitution (DS) of which is d (i.e., acetyl lignocellulose whose DS is d).

$SP_{cel}$ (SP value of cellulose) for use is a reference value disclosed in the literature (Jitsuyo Polymer Alloy Sekkei [Practical Design of Polymer Alloys], authored by Fumio Ide, Kogyo Chosakai Publishing Co., Ltd., first printing, published on Sep. 1, 1996, page 19).

$SP_{celac3}$ (SP value of cellulose triacetate) was determined from $SP_{cel}$ (SP value of cellulose disclosed in the literature) and $SP_{celac2}$ (SP value of cellulose diacetate disclosed in the literature).

More specifically, the relationship of the $SP_{cal}$ value (DS=0) and the $SP_{celac2}$ (DS=2) was assumed to be on a linear function determined by plotting these SP values on the ordinate and the corresponding DS values on the abscissa. The value at a DS of 3 was determined to be $SP_{celac3}$ (SP value of cellulose triacetate) from the determined linear function.

The chemical formulas of the repeating units of glucose (Glc), mannose (Man) and galactose (Gal) in glucanomannan (GlcMan) and arabinogalactan (AraGal) are identical ($—C_6H_{10}O_5$—). Thus, the SP value of these compounds and the SP value of acetylated forms of these compounds were assumed to be equivalent to those of cellulose, and used for calculating SP values.

The lignin in liguno pulp was assumed to consist only of β-0-4 lignin. When this lignin is acetylated, acetylated lignin is formed. Because the repeating unit of this lignin contains two hydroxyl groups, the maximum DS of the lignin is 2.

The SP value of lignin ($SP_{lig}$) and the SP value of lignin diacetate ($SP_{ligac2}$) were calculated in accordance with the Fedors method (Robert F. Fedors, Polymer Engineering and Science, February, 1974, vol. 14, No. 2, 147-154).

The SP value of xylan ($SP_{xyl}$) and the SP value of xylan diacetate ($SP_{xylac2}$) were also calculated in accordance with the Fedors method.

In the Fedors calculation, the $\Delta_{si}$ (evaporation energy) and $\Delta_{yi}$ (molar volume) of hydroxyl groups of xylan and lignin were all the values of secondary hydroxyl groups.

Because the repeating unit of arabinan (Ara) of arabinogalactan (AraGal) has a chemical formula identical to that of xylan (Xyl) ($—C_5H_6O_4$—), arabinan (Ara) was treated in the same manner as xylan (Xyl).

Because the DS value determined by the back titration method is based on the cellulose contained in ligno pulp, the DS of acetylated ligno pulp was calculated based on the DS value determined by the back titration method and the average molecular weight of ligno pulp (calculated from the abundance ratio of cellulose, hemicellulose, and lignin (molar ratio)).

The weight fractions of cellulose, hemicellulose, and lignin contained in ligno pulp were each converted to a molar fraction to determine the SP value (a) of unmodified ligno pulp (LP-OH) and the SP value (b) of ligno pulp whose hydroxyl groups were all acetylated (LP-OAC).

The SP value (Y) of acetyl lignocellulose whose DS value was d was determined from the following calculation formula by applying the SP value (a), SP value (b), and DS (c) of ligno pulp whose hydroxyl groups were all acetylated, assuming that the SP value (a), SP value (Y), and SP value (b) have a linear relationship.

$$Y=[-(a-b)/c]*d+a$$

wherein a, b, c, and d each represent the following.

a: SP value of unmodified ligno pulp (LP − OH) =

$SP_{cel}$ (SP value of cellulose)★(Cel + Man + Gal) +

$SP_{xyl}$ (SP value of xylan)★(Xyl + Ara) +

$SP_{lig}$ (SP value of lignin)★(lig)

b: SP value of ligno pulp whose hydroxyl groups are all acetylated (LP − OAC) =

$SP_{celac3}$ (SP value of cellulose triacetate)★(Cel + Man + Gal) +

$SP_{xylac}$ (SP value of xylan diacetate)★(Xyl + Ara) +

$SP_{ligac}$ (SP value of lignin diacetate)★(Lig)

c: (DS of ligno pulp whose hydroxyl groups are all acetylated) =

3★(Cel + Man + Gal) + 3★(Man) + 2★(Xyl + Ara) + 2★(Lig)

wherein (Cel), (Man), (Gal), (Xyl), (Ara), and (Lig) respectively indicate the molar fraction of cellulose, mannan, galactan, xylan, arabinan, and lignin contained in ligno pulp.

d: (DS of lignocellulose at the degree of acetylation (DS value determined by titration, referred to as "ds"))=ds* (average formula weight of the ligno pulp repeating unit)/ (formula weight of the cellulose repeating unit)

The asterisk (*) indicates the arithmetic symbol of multiplication (x).

Ignoring the lignin in lignocellulose with the lignin content of less than 1 mass % (i.e., when calculated based on the assumption that the lignin content is 0) was confirmed to substantially pose no problem by calculation.

The SP values of lignocelluloses and acetylated lignocellulose having a total content of cellulose and glucomannan of 92 mass % or more and a lignin content of 0.5 mass % or less were also confirmed to substantially pose no problem when calculated using the SP values of cellulose and cellulose diacetate disclosed in the literature, with the assumption that the lignocellulose consists only of cellulose.

(4) Thermoplastic Resin

The following thermoplastic resins were purchased for use.

For the SP values of these resins, values disclosed in the literature were used. When the SP value for a resin is indicated as a numerical range in the literature, the average of the numerical range was determined to be the SP value of the resin for use in the present invention. For example, the SP value of nylon 6 (PA6) disclosed in the literature was 11.6 to 12.7. Thus, the average of 11.6 and 12.7, i.e., 12.2 (rounded off to one decimal place), was determined to be the SP value of PA6.

TABLE 2

Table 2: SP Value of Thermoplastic Resin

| Name | Abbreviation | Manufacturer/ Distributor | Trade Name | Abbreviation | SP Value $(cal/cm^3)^{1/2}$ | SP Value in the Literature |
|---|---|---|---|---|---|---|
| Nylon 6 | PA6 | Unitika Ltd. | A1020LP | PA6 | 12.2 | Jiteuyo Polymer Alloy Sekkei, authored by Fumio Ide, Kogyo Chosakai Publishing Co., Ltd., first printing, published on Sep. 1, 1996, page 19 |
| Nylon 12 | PA12 | Daicel-Evonik Ltd. | Vestosint 2159 | PA12 | 9.3 | National Institute for Material Science, http://polymer.nims.go.jp/PolyInfo/cgi-blu/p-search.cgi, $SP = 19(J/cm^3)^{1/2} = 9.3(cal/cm^3)^{1/2}$ |
| Polyoxymethylene (Polyacetal) | POM | Mitsubishi Engineering-Plastics Corporation | Iupital F30-01F | POM | 11.1 | Jitsuyo Polymer Alloy Sekkei, authored by Fumio Ide, Kogyo Chosakai Publishing Co., Ltd., first printing, published on Sep. 1, 1996, page 19 |
| Polylactic Acid | PLA | Mitsui Chemicals, Inc. | Lacea H100 | PLA(H100) | 11.4 | JP2011-231285A |
| Polylactic Acid | PLA | NatureWorks LLC | Ingeo-3001D | PLA(3001D) | | |
| Polylactic Acid | PLA | NatureWorks LLC | Ingeo-3251D | PLA(3251D) | | |
| Polypropylene | PP | Japan Polypropylene Corporation | Novatec PP MA04A | PP(MA04A) | 8.1 | Jitsuyo Polymer Alloy Sekkei, authored by Fumio Ide, Kogyo Chosakai Publishing Co., Ltd., first printing, published on Sep. 1, 1996, page 19 |
| Polypropylene | PP | Japan Polypropylene Corporation | Novatev PPMA4AHB | PP(MA4AHB) | | |
| Polyethylene | PE | Asahi Kasei Chemicals Corporation | Suntec HD J320 | PE(J320) | 8.0 | Jitsuyo Polymer Alloy Sekkei, authored by Fumio Ide, Kogyo Chosakai Publishing Co., Ltd., first printing, published on Sep. 1, 1996, page 19 |

(5) Compatibilizer

The following compatibilizers were purchased for use.

The SP value of maleic-anhydride-modified polypropylene (MAPP, produced by Toyobo Co., Ltd.) is shown.

Calculation Method for SP of Compatibilizer (MAPP)

The SP value of MAPP was determined in accordance with the Fedors method. The details are as follows.

The structure of MAPP was divided into the maleic anhydride portion (MA portion), the residue portion obtained by removing the MA portion from the MAPP graft portion ("PP-MA portion"), and the polypropylene (PP) repeating unit portion (PP portion). The evaporation energy of each portion was multiplied by its molar fraction, and the resulting values were summed up to determine the evaporation energy of MAPP (ΔE).

For the molar volume of MAPP (ΔV) as well, the structure of MAPP was divided into the maleic anhydride portion (MA portion), the residue portion obtained by removing the MA portion from the MAPP graft portion (PP-MA portion), and the polypropylene (PP) repeating unit portion (PP portion). The molar volume of each portion was multiplied by its molar fraction, and the resulting values were summed up to determine the molar volume of MAPP (ΔV).

The value of MAPP calculated in accordance with the Fedors method ($SP_{mappcal}$) was multiplied by a correction factor (f) to determine the SP value of MAPP ($SP_{mapp}$). The following describes the formulas of this calculation.

$SP_{mapp} = f*(\Delta E/\Delta V)^{0.5}$ f (correction factor) = (SP of PP disclosed in the literature: 8.1)/($SP_{mappcal}$)

$\Delta E = f_a * \Sigma \Delta e_{ma} + f_{rec} * \Sigma \Delta e_{re} + f_{pp} * \Sigma \Delta e_{pp}$ $\Delta V = f_a * \Sigma \Delta v_{ma} + f_{rec} * \Sigma \Delta v_{re} + f_{pp} * \Sigma \Delta v_{pp}$ wherein ΔE indicates the evaporation energy of MAPP, and ΔV indicates the molar volume of MAPP.

$f_a$, $f_{rec}$, and $f_{pp}$ respectively indicate the molar fraction of the maleic anhydride portion (MA portion), the residue obtained by removing the MA portion from the MAPP graft portion (PP-MA portion), and the polypropylene repeating unit portion (PP portion) in MAPP.

$\Delta e_{ma}$, $\Delta e_{re}$, and $\Delta e_{pp}$ respectively indicate the evaporation energy of the maleic anhydride portion (MA portion), the residue portion obtained by removing the MA portion from the MAPP graft portion (PP-MA portion), and the polypropylene repeating unit portion (PP portion) determined by the Fedors method.

$\Delta v_{ma}$, $\Delta v_{re}$, and $\Delta v_{pp}$ respectively indicate the molar volume of the maleic anhydride portion (MA portion), the residue obtained by removing the MA portion from the MAPP graft portion (PP-MA portion), and the polypropylene (PP) repeating unit portion (PP portion) determined by the Fedors method.

The asterisk (*) indicates the arithmetic symbol of multiplication (x).

TABLE 3

SP Value of Compatibilizer

| MAPP | Trade Name | Abbreviation | Acid Addition Amount (Mass %) | SP Value $(cal/cm^3)^{1/2}$ |
|---|---|---|---|---|
| MAPP-1 | TOYOTAC PMA H1000P | MAPP (H1000P) | 5 | 8.34 |
| MAPP-2 | TOYOTAC PMA H1100P | MAPP (H1100P) | 3.5 | 8.28 |

TABLE 3-continued

SP Value of Compatibilizer

| MAPP | Trade Name | Abbreviation | Acid Addition Amount (Mass %) | SP Value $(cal/cm^3)^{1/2}$ |
|---|---|---|---|---|
| MAPP-3 | TOYOTAC PMA H3000P | MAPP (H3000P) | 5 | 8.34 |
| MAPP-4 | TOYOTAC PMA-L | MAPP (PMA-L) | 1.7 | 8.17 |
| MAPP-5 | TOYOTAC PMA-HM | MAPP (PMA-HM) | 3.2 | 8.25 |

III. Examples and Comparative Examples (1) Production and Evaluation of Acetylated Plant Fiber (AcNUKP)-Containing Master Batch
(1-1) Materials for Use The master batch, fiber-reinforced resin composition, and molded article of the present invention were produced using a range of materials having different SP values. These were also used in Comparative Examples.
(a) Acylated plant fibers (AcylCF): AcNUKP(1) (DS=0.81) (raw material of acylated, microfibrillated plant fibers (AcylMF))
(b) Resin for master batch (the unit for the SP value is $(cal/cm^3)^{1/2}$)
   PA6: SP=12.2
   PA12: SP=9.3
   POM: SP=11.1
   PLA (H100): SP=11.4
   PP (MA04A): SP=8.1
(c) Compatibilizer: MAPP (H1100P), SP=8.28
(d) Resin for dilution
   PP: PP (MA04A), SP=8.1
(e) Antioxidant: Irganox 1010 produced by BASF
   (which may be simply referred to as "Irganox 1010")
(1-2) Method for Producing Acetylated Plant Fiber (AcNUKP)-Containing Master Batch The master batch may be abbreviated as "MB" below.

Acetylated plant fibers (AcCF) (AcNUKP(1), 25.3 g on an absolute dry product basis), a resin for a master batch (Pm) (35.3 g of PA6, PA12, PCOM, or PLA), a compatibilizer (Com) (MAPP 9.4 g), and an antioxidant (2.1 g) were placed in a polyethylene bag and shaken to mix them.

Table 4 shows the percentage (mass %) of each component in the mixture.

72.1 g of the obtained mixture was kneaded with the twin-screw kneader (KZW15TW-45MG produced by Technovel Corporation) with heating, thereby producing a master batch containing the microfibrillated AcNUKP (AcMF) (a), the resin for a master batch (PR) (PA6, PA12, PCM, or PLA) (b), the compatibilizer (Cam) (MAPP) (c), and the antioxidant.

The kneading temperature was as described in the Kneader and Operating Conditions for Use in Production of Master Batch and Resin Composition section.

Table 4 shows the formulations of the master batches according to the present invention together with the formulations of Comparative Examples described later (1-a).

TABLE 4

Table 4: (1-a) Components of Master Batch (Master Batch is indicated as "MB")

| | | Contained Fiber | | | Modified Fiber Content % | | Components of MB | | | | | |
|---|---|---|---|---|---|---|---|---|---|---|---|---|
| | | Contained as AcylMF | | | Modified Group | Fiber | Resin for MB | | | Compatibilizer | | | Antioxidant |
| Test System | Test Number | Type | DS | SP | Portion | Portion | Type | SP | % | Type | SP | % | Content % |
| Example PA6/PP System | KH-19 | AcNUKP (1) | 0.81 | 13.8 | 6.1 | 29.2 | PA6 | 12.2 | 48.4 | MAPP (H1100P) | 8.28 | 13.4 | 2.9 |
| Example PA12/PP System | KH-77 | AcNUKP (1) | 0.81 | 13.8 | 6.1 | 29.2 | PA12 | 9.3 | 48.4 | MAPP (H1100P) | 8.28 | 13.4 | 2.9 |
| Example POM/PP System | KH-91 | AcNUKP (1) | 0.81 | 13.8 | 6.1 | 29.2 | POM | 11.1 | 48.4 | MAPP (H1100P) | 8.28 | 13.4 | 2.9 |
| Example PLA/PP System | KH-89 | AcNUKP (1) | 0.81 | 13.8 | 6.1 | 29.2 | PLA (H100) | 11.4 | 48.4 | MAPP (H1100P) | 8.28 | 13.4 | 2.9 |
| Comparative Example PP Alone | PP Alone | None | — | — | — | — | — | — | — | — | — | — | — |
| Comparative Example SPm<9 PP/PP System | KH-17 | AcNUKP (1) | 0.81 | 13.8 | 6.1 | 29.2 | PP (MA04A) | 8.1 | 48.4 | MAPP (H1100P) | 8.28 | 13.4 | 2.9 |
| Comparative Example No MAPP added PA6/PP System | KH-11 | AcNUKP (1) | 0.81 | 13.8 | 6.1 | 29.2 | PA6 | 12.2 | 61.8 | — | — | 0.0 | 2.9 |
| Comparative Example No AcMF added PA6/PP System | KH-45 | None | — | — | — | — | PA6 | 12.2 | 78.5 | MAPP (H1100P) | 8.28 | 21.5 | 0 |
| Comparative Example No AcMF added PLA/PP System | PLAMF0 | None | — | — | — | — | PLA (H100) | 11.4 | 78.5 | MAPP (H1100P) | 8.28 | 21.5 | 0 |

(1-3) Production of Fiber-Reinforced Resin Composition and Molded Article (Test Specimen for Strength Test)

60 g of the obtained master batch and a resin for dilution (Pd) (PP 120 g) were mixed and kneaded with the twin-screw extruder with heating. Subsequently, the molten kneaded product was formed into pellets with a pelletizer (produced by Technovel Corporation).

Thus, a fiber-reinforced resin composition containing microfibrillated AcNUKP (AcMF) (a), a resin for a master batch (Pm) (PA6, PA12, POM, or PLA) (b), a conpatibilizer (Com) (MAPP) (c), and an antioxidant in the form of pellets according to the present invention was obtained.

The kneading temperature was as described in the Kneader and Operating Conditions for Use in Production of Master Batch and Resin Composition section.

150 g of this composition in pellet form was placed in an injection molder (NPX7-1F produced by Nissei Plastic Industrial Co., Ltd.), thereby preparing a dumbbell-shaped molded specimen (thickness: 1 nm, parallel portion length: 38 am).

The heating cylinder temperature was set to 230° C. only when the resin for a master batch was PA6, and set to 190° C. for other resins.

The mold temperature was set to 40° C. to perform molding.

Table 5 shows the formulations of fiber-reinforced resin compositions of the present invention, together with the formulations of Comparative Examples described later (1-b).

Table 6 shows the strength characteristics of the molded articles of the present invention, together with the formulations of master batches, formulations of fiber-reinforced resin compositions, and solubility parameters (SP value) of the compositions. Table 6 also shows the formulations and strength characteristics of molded articles of Comparative Examples described later (1-c).

In the tables, "Modified Group Portion" in the Modified Fiber Content % column indicates the percentage by mass of the acyl group portion contained in an acylated fiber. "Fiber portion" indicates the percentage by mass of a portion of an acylated fiber that remains after the acyl group portion is deducted from the acylated fiber.

The master batches, compositions, and molded articles in the Comparative Examples were produced in accordance with the production methods of the Examples, and strength characteristics were measured in the same manner as in the Examples.

TABLE 5

Table 5 (1-b) Components of Fiber-reinforced Resin Composition and Molded Article (Master Batch is indicated as "MB")

| Test System | Test Number | Contained Fiber Contained as AcylMF Type | DS | SP | Modified Fiber Content % Modified Group Portion | Fiber Portion | Resin For MB Type | Content % | Compatibilizer Type | Content % | Resin for Dilution Type | SP | Content % | Antioxidant Content % |
|---|---|---|---|---|---|---|---|---|---|---|---|---|---|---|
| Example PA6/PP System | KH-19 | AcNUKP (1) | 0.81 | 13.8 | 2.0 | 9.7 | PA6 | 16.1 | MAPP (H1100P) | 4.5 | PP (MA04A) | 8.1 | 66.7 | 1.0 |
| Example PA12/PP System | KH-77 | AcNUKP (1) | 0.81 | 13.8 | 2.0 | 9.7 | PA12 | 16.1 | MAPP (H1100P) | 4.5 | PP (MA04A) | 8.1 | 66.7 | 1.0 |
| POM/PP System Example | KH-91 | AcNUKP (1) | 0.81 | 13.8 | 2.0 | 9.7 | POM | 16.1 | MAPP (H1100P) | 4.5 | PP (MA04A) | 8.1 | 66.7 | 1.0 |
| Example PLA/PP System | KH-89 | AcNUKP (1) | 0.81 | 13.8 | 2.0 | 9.7 | PLA (H100) | 16.1 | MAPP (H1100P) | 4.5 | PP (MA04A) | 8.1 | 66.7 | 1.0 |
| Comparative Example PP Alone | PP Alone | None | — | — | — | — | — | — | — | — | PP (MA04A) | 8.1 | 100.0 | — |
| Comparative Example SPm<9 PP/PP System | KH-17 | AcNUKP (1) | 0.81 | 13.8 | 2.0 | 9.7 | PP (MA04A) | 16.1 | MAPP (H1100P) | 4.5 | PP (MA04A) | 8.1 | 66.7 | 1.0 |
| Comparative Example No MAPP added PA6/PP System | KH-11 | AcNUKP (1) | 0.81 | 13.8 | 2.0 | 9.7 | PA6 | 20.6 | MAPP (H1100P) | 0.0 | PP (MA04A) | 8.1 | 66.7 | 1.0 |
| Comparative Example No AcMF added PA6/PP System | KH-45 | None | — | — | 0.0 | 0.0 | PA6 | 19.0 | MAPP (H1100P) | 5.2 | PP (MA04A) | 8.1 | 75.8 | — |

TABLE 5-continued

Table 5 (1-b) Components of Fiber-reinforced Resin Composition and Molded Article (Master Batch is indicated as "MB")

| | | Contained Fiber Contained as AcylMF | | | Modified Fiber Content % | | Resin For MB | | Compatibilizer | | Resin for Dilution | | | Anti-oxidant |
|---|---|---|---|---|---|---|---|---|---|---|---|---|---|---|
| Test System | Test Number | Type | DS | SP | Modified Group Portion | Fiber Portion | Type | Content % | Type | Content % | Type | SP | Content % | Content % |
| Comparative Example No AcMF added PLA/PP System | PLAMF0 | None | — | — | 0.0 | 0.0 | PLA (H100) | 19.0 | MAPP (PMA-L) | 5.2 | PP (MA04A) | 8.1 | 75.8 | — |

TABLE 6

Table 6 (1-c) Relationship between Strength Characteristics of Molded Article and SP Values of Components in Composition (Master Batch is indicated as "MB")

Components of MB AclyMF content in the Examples: 35.3%
Additionally, Antioxidant: 2.9%

| | | Contained Fiber Contained as AcylMF | | | Resin for MB in the Examples: 48.4% | | Compatibilizer in the Examples: 13.4% | |
|---|---|---|---|---|---|---|---|---|
| Test System | Test Number | Type | DS | SP | Type | SP | Type | SP |
| Example PA6/PP System | KH-19 | AcNUKP (1) | 0.81 | 13.8 | PA6 | 12.2 | MAPP (H1100P) | 8.3 |
| Example PA12/PP System | KH-77 | AcNUKP (1) | 0.81 | 13.8 | PA12 | 9.3 | MAPP (H1100P) | 8.3 |
| POM/PP System Example | KH-91 | AcNUKP (1) | 0.81 | 13.8 | POM | 11.1 | MAPP (H1100P) | 8.3 |
| Example PLA/PP System | KH-89 | AcNUKP (1) | 0.81 | 13.8 | PLA (H100) | 11.4 | MAPP (H1100P) | 8.3 |
| Comparative Example PP Alone | PP Alone | None | — | — | — | — | — | — |
| Comparative Example SPm < 9 PP/PP System | KH-17 | AcNUKP (1) | 0.81 | 13.8 | PP (MA04A) | 8.1 | MAPP (H1100P) | 8.3 |
| Comparative Example No MAPP added PA6/PP System | KH-11 | AcNUKP (1) | 0.81 | 13.8 | PA6(*) | 12.2 | — | — |
| Comparative Example No AcMF added PA6/PP System | KH-45 | None | — | — | PA6 | 12.2 | MAPP (H1100P) | 8.3 |
| Comparative Example No AcMF added PLA/PP System | PLAMF0 | None | — | — | PLA (H100) | 11.4 | MAPP (H1100P) | 8.3 |

TABLE 6-continued

Table 6 (1-c) Relationship between Strength Characteristics of Molded Article and
SP Values of Components in Composition (Master Batch is indicated as "MB")

| | | Components of Fiber-reinforced Resin Composition and Molded Article AcylMF content in the Examples: 11.7% In addition to the components below, Antioxidant: 1% | | | | Molded Article Strength Characteristics | |
|---|---|---|---|---|---|---|---|
| | | Resin for | | Resin for | | | |
| Test System | Test Number | MB in the Examples: 16.1% Type | Compatibilizer in the Examples: 4.5% Type | Dilution in the Examples: 66.7% Type | SP | Tensile Elastic Modulus GPa | Tensile Strength MPa |
| Example PA6/PP System | KH-19 | PA6 | MAPP (H1100P) | PP (MA04A) | 8.1 | 3.1 | 52 |
| Example PA12/PP System | KH-77 | PA12 | MAPP (H1100P) | PP (MA04A) | 8.1 | 3.1 | 54 |
| POM/PP System Example | KH-91 | POM | MAPP (H1100P) | PP (MA04A) | 8.1 | 3.2 | 50 |
| Example PLA/PP System | KH-89 | PLA (H100) | MAPP (H1100P) | PP (MA04A) | 8.1 | 3.5 | 52 |
| Comparative Example PP Alone | PP Alone | — | — | PP (MA04A) | 8.1 | 2.6 | 42 |
| Comparative Example SPm < 9 PP/PP System | KH-17 | PP (MA04A) | MAPP (H1100P) | PP (MA04A) | 8.1 | 2.8 | 48 |
| Comparative Example No MAPP added PA6/PP System | KH-11 | PA6 | MAPP (H1100P) | PP (MA04A) | 8.1 | 2.8 | 35 |
| Comparative Example No AcMF added PA6/PP System | KH-45 | PA6 | MAPP (H1100P) | PP (MA04A) | 8.1 | 1.8 | 16 |
| Comparative Example No AcMF added PLA/PP System | PLAMF0 | PLA (H100) | MAPP (PMA-L) | PP (MA04A) | 8.1 | 2.0 | 39 |

(*)In KH-11, the PA6 content in MB is 61.8%

(1-4) Evaluation of Examples and Comparative Examples

The strength characteristics of every molded article of the Examples was superior to that of Comparative Examples (PP alone).

In the Comparative Example with test number KH-17, a molded article was prepared by using PP (SP=8.1) as a master batch resin, and compared with the molded articles of Examples (test number: KH-19, KH-77, KH-99, and KH-89) prepared using a resin for a master batch with an SP of 9 or more.

While the molded articles prepared using a master batch resin (Mb) with an SP of 9 or more and PP (SP=8.1) as a resin for dilution (Md), according to the present invention, had a tensile elastic modulus within the range of 3.1 to 3.5 GPa, the molded article of the Comparative Example (test number: KH-17, a resin for a master batch, SP=8.1) had a tensile elastic modulus of 2.6 GPa. Specifically, this indicates that the use of a resin for a master batch (Pm) with an SP of 9 or more provides, in particular, a molded article with high elastic modulus.

While the molded articles prepared in the Examples had a tensile strength within the range of 50 to 54 MPa, the molded article prepared in the Comparative Example had a tensile strength of 48 MPa. The molded articles in the Examples were better.

The results reveal that the use of a thermoplastic resin for a master batch (Pm) that has a solubility parameter higher than the solubility parameter ($SP_{pm}$) of the resin for dilution (Pd), and that is 9 or more, provides a molded article excellent in strength characteristics.

The effect of the compatibilizer (Com) was clear from the comparison of the Example with test number KH-19 with the corresponding Comparative Example (test number: KH-11, in which compatibilizer (Com) (MAPP) was not contained).

While the molded article prepared in the Example with test number KH-19, according to the present invention, had an elastic modulus of 3.1 GPa and a tensile strength of 52 MPa, the molded article prepared in Comparative Example with test number KH-11 had an elastic modulus of 2.8 GPa and a tensile strength of 35 MPa.

This reveals that the use of a compatibilizer (Com) with a solubility parameter ($SP_{com}$) equal or lower than the solubility parameter ($SP_{acylmf}$) of acylated, microfibrillated plant fibers (microfibrillated AcNUKP) (AclMF) in a master batch provides a molded article excellent in strength characteristics.

The effect of the acylated, microfibrillated plant fibers (AclMF) can be determined by comparing the strength characteristics of the molded article of the Example with test number KH-19, according to the present invention, produced from the master batch with test number KH-19 according to the present invention (prepared by molten-kneading a composition containing acylated plant fibers (AcNUKP) and PA6) with the strength characteristics of the Comparative Example with test number KH-45 (in which acylated, microfibrillated plant fibers were not contained).

A comparison of the molded article of the present invention (test number KH-19) with the molded article of the Comparative Example (KH-45) in strength characteristics reveals that while the molded article of the present invention (test number KH-19) had an elastic modulus of 3.1 GPa and a tensile strength of 52 MPa, the molded article of the Comparative Example (test number KH-45) had an elastic modulus of 1.8 GPa and a tensile strength of 16 MPa.

The effect of the acylated, microfibrillated plant fibers can also be understood from the comparison of the strength characteristics of the molded article of the Example with test number KH-89, according to the present invention, prepared from the master batch with test number KH-89 (prepared by molten-kneading a composition containing acylated plant fibers (AcNUKP) and PLA) with the strength characteristics of the Comparative Example with test number PLAMF0 (in which acylated, microfibrillated plant fibers were not contained).

A comparison of the strength characteristics of the molded article of the present invention (test number KH-89) with the strength characteristics of the Comparative Example with test number PLAMF0 in which acylated, microfibrillated plant fibers were not contained reveals that while the molded article of the present invention had an elastic modulus of 3.5 GPa and a tensile strength of 52 MPa, the molded article of the Comparative Example (test number PLAMF0) had an elastic modulus of 2.0 GPa and a tensile strength of 39 MPa.

The results indicate that to obtain a fiber-reinforced molded article with excellent strength characteristics, acylated, microfibrillated plant fibers need to be added.

Acylated plant fibers are used in the production of a master batch. When acylated plant fibers are kneaded with a resin for a master batch in the production of a master batch, and when the master batch is molten-kneaded with a resin for dilution in the production of a fiber-reinforced resin composition of the present invention, the acylated plant fibers are microfibrillated during kneading. As a result, the master batch of the present invention, the fiber-reinforced resin composition of the present invention, and the fiber-reinforced resin molded article of the present invention contain acylated, microfibrillated plant fibers.

(2) Effect of SP of Acylated Plant Fiber on Strength Characteristics of Molded Article In accordance with the method described in Production of Fiber-reinforced Resin Composition and Molded Article (Test Specimen for Strength Test) according to the present invention, master batches that contain acylated (acetylated), microfibrillated fibers (AcylMF) having different SP values of the present invention (Examples) and a master batch that contains unmodified plant fibers of the Comparative Example with test number KH-320 (which corresponds to the Example with test number KH-217) were prepared. Table 7 shows the details of components of these mater batches (2-a).

Subsequently, fiber-reinforced resin compositions shown in Table 8 were prepared using these master batches (2-b), and molded articles shown in Table 9 were prepared, followed by measurement of strength characteristics (2-c).

Note for the Method for Kneading MB(*) in Table 9
One-step Method: Fibers, a resin for a master batch, and a compatibilizer are kneaded all at once.
Two-step Method: After fibers and a resin for a master batch are kneaded, a compatibilizer is mixed and kneaded.
High-speed Rotation: The screw rotation of a kneader is set to 400 rpm (circumferential velocity: 18,850 mm/min), and kneading is performed.

The kneader was operated at 200 rpm (circumferential velocity: 9,425 mm/min) if high-speed rotation is not indicated.

TABLE 7

Table 7 (2-a) Components of Master Batch (acylated plant fibers having different SP values were used) (Master Batch is indicated as "MB")

| | | Contained Fiber | | | Modified Fiber Content % | | Components of MB | | | | | | |
|---|---|---|---|---|---|---|---|---|---|---|---|---|---|
| | | MF is contained in NB of Examples | | | Modified Group | Fiber | Resin for MB | | | Compatibilizer | | | Anti- | MB |
| Test System | Test Number | Type | DS | SP | Portion | Portion | Type | SP | % | Type | SP | % | oxidant Content % | Kneading Method |
| Example PA12/PP System | KH-77 | AcNUKP (1) | 0.81 | 13.8 | 6.1 | 29.2 | PA12 | 9.3 | 48.4 | MAPP (H1100P) | 8.28 | 13.4 | 2.9 | One-step |
| | KH-78 | AcNBKP | 1.01 | 13.4 | 7.6 | 29.2 | PA12 | 9.3 | 47.2 | MAPP (H1100P) | 8.28 | 13.1 | 2.9 | One-step |
| | KH-79 | AcNBKP | 1.57 | 12.2 | 11.9 | 29.2 | PA12 | 9.3 | 43.8 | MAPP (H1100P) | 8.28 | 12.2 | 2.9 | One-step |
| | KH-80 | AcNBKP | 2.52 | 10.0 | 19.0 | 29.2 | PA12 | 9.3 | 38.1 | MAPP (H1100P) | 8.28 | 10.8 | 2.9 | One-step |

TABLE 7-continued

Table 7 (2-a) Components of Master Batch (acylated plant fibers having different SP values were used)
(Master Batch is indicated as "MB")

|  |  | Components of MB | | | | | | | | | | | |
|---|---|---|---|---|---|---|---|---|---|---|---|---|---|
|  |  | Contained Fiber | | | | Modified Fiber Content % | | Resin for MB | | | Compatibilizer | | | Anti- | MB |
|  |  | MF is contained in NB of Examples | | | | Modified Group | Fiber | | | Content | | | Content | oxidant | Kneading |
| Test System | Test Number | Type | DS | SP | Portion | Portion | Type | SP | % | Type | SP | % | Content % | Method |
|  | KH-85 | AcNUKP (1) | 0.81 | 13.8 | 6.1 | 29.2 | PA12 | 9.3 | 48.4 | MAPP (H1100P) | 8.28 | 13.4 | 2.9 | One-step |
| Example PLA/PP System | KH-265 | AcNUKP (2) | 0.97 | 13.4 | 7.5 | 29.2 | PLA (3001D) | 11.4 | 46.4 | MAPP (PMA-L) | 8.17 | 14.0 | 2.9 | One-step (High Speed) |
|  | KH-217 | AcNUKP (2) | 0.97 | 13.4 | 7.5 | 29.2 | PLA (3001D) | 11.4 | 46.4 | MAPP (PMA-L) | 8.17 | 14.0 | 2.9 | Two-step (High Speed) |
|  | KH-313 | AcNUKP (2) | 0.97 | 13.4 | 7.5 | 29.2 | PLA (3251D) | 11.4 | 46.4 | MAPP (PMA-HM) | 8.25 | 14.0 | 2.9 | Two-step (High Speed) |
| Comparative Example | KH-320 | NUKP (2) | 0 | 15.5 | 0.0 | 29.2 | PLA (3001D) | 11.4 | 53.9 | MAPP (PMA-L) | 8.17 | 14.0 | 2.9 | Two-step (High Speed) |

TABLE 8

Table 8 (2-b) Components of Fiber-reinforced Resin Composition and Molded Article (chemically modified
plant fibers having different SP values are contained) (Master Batch is indicated as ""MB")

|  |  | Formulation of Fiber-reinforced Resin Composition | | | | | | | | | | | | | |
|---|---|---|---|---|---|---|---|---|---|---|---|---|---|---|---|
|  |  | Contained Fiber Contained as AclyNP in Compositions of Examples | | | | Modified Fiber Content % | | Resin for MB | | Compatibilizer | | Resin for Dilution | | | Anti- oxidant |
|  |  | | | | | Modified Group | Fiber | | Content | | Content | | | Content | Content |
| Test System | Test Number | Type | DS | SP | | Portion | Portion | Type | % | Type | % | Type | SP | % | % |
| Example PA12/PP System | KH-77 | AcNUKP (1) | 0.81 | 13.8 | | 2.0 | 9.7 | PA12 | 16.1 | MAPP (H1100P) | 4.5 | PP (MA04A) | 8.1 | 66.7 | 1.0 |
|  | KH-78 | AcNBKP | 1.01 | 13.4 | | 2.5 | 9.7 | PA12 | 15.7 | MAPP (H1100P) | 4.4 | PP (MA04A) | 8.1 | 66.7 | 1.0 |
|  | KH-79 | AcNBKP | 1.57 | 12.2 | | 3.9 | 9.7 | PA12 | 14.6 | MAPP (H1100P) | 4.1 | PP (MA04A) | 8.1 | 66.7 | 1.0 |
|  | KH-80 | AcNBKP | 2.52 | 10.0 | | 6.3 | 9.7 | PA12 | 12.7 | MAPP (H1100P) | 3.6 | PP (MA04A) | 8.1 | 66.7 | 1.0 |
|  | KH-85 | AcNUKP (1) | 0.81 | 13.8 | | 2.0 | 9.7 | PA12 | 16.1 | MAPP (H1100P) | 4.5 | PP (MA4AHB) | 8.1 | 66.7 | 1.0 |
| Example PLA/PP System | KH-265 | AcNUKP (2) | 0.97 | 13.37 | | 2.5 | 9.7 | PLA (3001D) | 15.5 | MAPP (PMA-L) | 4.7 | PP (MA4AHB) | 8.1 | 66.7 | 1.0 |
|  | KH-217 | AcNUKP (2) | 0.97 | 13.4 | | 2.5 | 9.7 | PLA (3001D) | 15.5 | MAPP (PMA-L) | 4.7 | PP (MA4AHB) | 8.1 | 66.7 | 1.0 |
|  | KH-313 | AcNUKP (2) | 0.97 | 13.4 | | 2.5 | 9.7 | PLA (3251D) | 15.5 | MAPP (PMA-BM) | 4.7 | PP (MA4AHB) | 8.1 | 66.7 | 4.0 |
| Comparative Example | KH-320 | NUKP (2) | 0 | 15.5 | | 0.0 | 9.7 | PLA (3001D) | 18.0 | MAPP (PMA-L) | 4.7 | PP (MA4AHB) | 8.1 | 66.7 | 1.0 |

TABLE 9

Table 9 (2-c) Relationship between Strength Characteristics of Molded Article and SP Value of Chemically Modified Fiber (Master Batch is indicated as "MB")

| | | Contained Fiber AcylMF is contained in MB, Composition, and Molded Articles of Examples | | | Components of MB (MF is present in an amount of 29.2% on an unmodified fiber basis.) (Also, an antioxidant is present in an amount of 2.9% in addition to the components below.) | | | |
|---|---|---|---|---|---|---|---|---|
| | | | | | Resin for MB SP of Resin: PA12 (9.3) PLA (11.4) | | Compatibilizer SP of MAPP: H1100P (8.3) PMA-L (8.2) | |
| Test System | Test Number | Type | DS | SP | Type | Content % | Type | Content % |
| Example PA12/PP System | KH-77 | AcNUKP (1) | 0.81 | 13.8 | PA12 | 48.4 | MAPP (H1100P) | 13.4 |
| | KH-78 | AcNBKP | 1.01 | 13.4 | PA12 | 47.2 | MAPP (H1100P) | 13.1 |
| | KH-79 | AcNBKP | 1.57 | 12.2 | PA12 | 43.8 | MAPP (H1100P) | 12.2 |
| | KH-80 | AcNBKP | 2.52 | 10.0 | PA12 | 38.1 | MAPP (H1100P) | 10.8 |
| | KH-85 | AcNUKP (1) | 0.81 | 13.8 | PA12 | 48.4 | MAPP (H1100P) | 13.4 |
| Example PLA/PP System | KH-265 | AcNUKP (2) | 0.97 | 13.4 | PLA (3001D) | 46.4 | MAPP (PMA-L) | 14.0 |
| | KH-217 | AcNUKP (2) | 0.97 | 13.4 | PLA (3001D) | 46.4 | MAPP (PMA-L) | 14.0 |
| | KH-313 | AcNUKP (2) | 0.97 | 13.4 | PLA (3251D) | 46.4 | MAPP (PMA-HM) | 14.0 |
| Comparative Example | KH-320 | NUKP (2) | 0 | 15.5 | PLA (3001D) | 53.9 | MAPP (PMA-L) | 14.0 |

| | | Components of Fiber-reinforced Resin Composition and Molded Article (MF is present in an amount of 9.7% on an unmodified fiber basis.) (Also, an antioxidant is present in an amount of 1% in addition to the components below.) | | | | Molded Article Strength Characteristics | |
|---|---|---|---|---|---|---|---|
| | | The type of resin for MB is the same as resin for MB. Content % | The type of compatibilizer is the same as in MB. Content % | Content of Resin for Dilution: all 66.7% (SP: all 8.1) Type | Method for Kneading MB (*) | Tensile Elastic Modulus GPa | Tensile Strength MPa |
| Test System | Test Number | | | | | | |
| Example PA12/PP System | KH-77 | 16.1 | 4.5 | PP (MA04A) | One-step | 3.1 | 54 |
| | KH-78 | 15.7 | 4.4 | PP (MA04A) | One-step | 3.2 | 55 |
| | KH-79 | 14.6 | 4.1 | PP (MA04A) | One-step | 3.0 | 52 |
| | KH-80 | 12.7 | 3.6 | PP (MA04A) | One-step | 2.6 | 44 |
| | KH-85 | 16.1 | 4.5 | PP (MA4AMB) | One-step | 3.5 | 61 |
| Example PLA/PP System | KH-265 | 15.5 | 4.7 | PP (MA4AHB) | One-step (High) Speed Rotation) | 3.2 | 58 |
| | KH-217 | 15.5 | 4.7 | PP (MA4AHB) | Two-step (High) Speed Rotation) | 3.9 | 67 |
| | KH-313 | 15.5 | 4.7 | PP (MA4AHB) | Two-step (High) Speed Rotation) | 4.2 | 67 |

TABLE 9-continued

Table 9 (2-c) Relationship between Strength Characteristics of Molded Article and
SP Value of Chemically Modified Fiber (Master Batch is indicated as "MB")

| | | | | | | | |
|---|---|---|---|---|---|---|---|
| Comparative Example | KH-320 | 18.0 | 4.7 | PP (MA4AHB) | Two-step (High) Speed Rotation | 2.8 | 50 |

The molded articles prepared from master batches containing acylated (acetylated), microfibrillated fibers of the present invention exhibited excellent strength characteristics. When the SP value was 10, the strength characteristics were likely to show a slight decrease. Thus, the use of acylated plant fibers with a SP value of up to 10 (for acetylated plant fibers, DS is 2.52) is preferable.

The effect of the use of a master batch containing acylated plant fibers is clear from a comparison of the strength characteristics of the molded article of the Example with test number KH-217 with the strength characteristics of the molded article prepared from the master batch of the Comparative Example with test number KH-320 (which contains unmodified plant fibers).

The molded article of the present invention had an elastic modulus about 1.4 times higher than that of the Comparative Example.

The Example with test number KH-217 of the present invention demonstrates that two-step kneading for a master batch increases the strength characteristics of the resulting molded article. The molded article of the Example with test number KH-217 had an elastic modulus about 1.2 times higher than that of the Example with test number KH-265.

The Example with test number KH-313 of the present invention demonstrates that the use of PLA and MAPP that are different from those of KH-217 also achieves an equivalent reinforcing effect.

The following explains the fact that acylated plant fibers are microfibrillated in a molded article of the present invention with reference to the molded article of test number KH-217 (a dumbbell-shaped test specimen, KH-217) simply, for example.

Most of the acylated, microfibrillated plant fibers (AcylMF) in a composite are oriented in the same direction as the molding direction during injection molding. Thus, when the molded article is observed in the same direction as the molding direction, the cross-sectional surface of AcylMF can be observed.

A KH-217 dumbbell-shaped test specimen (i.e., a molded article of the present invention prepared using a master batch of the present invention diluted with a resin for dilution (PP); the master batch was prepared by molten-kneading AcNUKP (2) and a resin for a master batch (PLA)) was cut in the direction perpendicular to the molding direction, and the cross-sectional surface was observed with a transmission electron microscope (TEM). FIG. 1 shows a transmission electron microscope (TEM) image of the surface.

The dark parts in the image of FIG. 1 are acylated, microfibrillated plant fibers (i.e., microfibrillated AcNUKP (2)). From this figure, AcNUKP (2) is confirmed to have been defibrated into 100 nm to several hundreds nm in size.

(3) Effects of Master Batch Kneading Speed on Strength Characteristics of Molded Article A molded article (test number KH-96) of the present invention was produced in the same manner as in the Example with test number KH-89, except that the resin for dilution PP (MA04A) in KH-89 was replaced with PP (MA4AHB).

A master batch of test number KH-97 was produced in the same manner as in test number KH-96, except that the kneading rotation speed for the master batch of test number KH-96 of the present invention (200 rpm, circumferential velocity of 9,425 mm/min) was doubled (400 rpm, circumferential velocity of 18,850 m/min). From this master batch, a molded article was prepared.

The results reveal that setting a higher screw rotation speed for the kneader in the production of a master batch and using a resin for dilution with a low melt flow rate (MFR) are advantageous in preparing a molded article with excellent strength characteristics. MRF of PP (MA04A) was 40 (g/10 min), and MFR of PP MA4AHB was 5.9 (g/10 min).

TABLE 10

Table 10: Effect of Master Batch Kneading Speed on Strength Characteristics of Molded Article
(Master Batch is indicated as "MB")

Components of MB
AcylMF is present in an amount of 35.3% in Examples
Also, antioxidant is present in an amount of 2.9%.

| Test System | MB Kneading Screw Rotation Speed (rpm) | Test Number | Contained Fiber AcylMF is contained. | | | Resin for MB present in an amount of 48.4% in Examples | | Compatibilizer present in an amount of 13.4% in Examples | |
|---|---|---|---|---|---|---|---|---|---|
| | | | Type | DS | SP | Type | SP | Type | SP |
| Example PLA/PP | 200 | KH-89 | AcNUKP (1) | 0.81 | 13.8 | PLA (H100) | 11.4 | MAPP (H1100P) | 8.28 |

TABLE 10-continued

Table 10: Effect of Master Batch Kneading Speed on Strength Characteristics of Molded Article
(Master Batch is indicated as "MB")

| Test System | MB Kneading Screw Rotation Speed (rpm) | Test Number | Resin for MB present in an amount of 16.1% in Examples Type | Compatibilizer present in an amount of 4.5% in Examples Type | Resin for dilution present in an amount of 66.7% in Examples Type | SP | Molded Article Strength Characteristics Tensile Elastic Modulus GPa | Tensile Strength MPa |
|---|---|---|---|---|---|---|---|---|
| System | 200 | KH-96 | AcNUKP (1) | 0.81 | 13.8 | PLA (H100) | 11.4 | MAPP (H1100P) | 8.28 |
| | 400 | KH-97 | AcNUKP (1) | 0.81 | 13.8 | PLA (H100) | 11.4 | MAPP (H1100P) | 8.28 |

Components of Fiber-reinforced Resin Composition and Molded Article
AcylMF is present in an amount of 11.7% in Examples. Also, an antioxidant is present in an amount of 1%.

| Test System | MB Kneading Screw Rotation Speed (rpm) | Test Number | Resin for MB present in an amount of 16.1% in Examples Type | Compatibilizer present in an amount of 4.5% in Examples Type | Resin for dilution present in an amount of 66.7% in Examples Type | SP | Tensile Elastic Modulus GPa | Tensile Strength MPa |
|---|---|---|---|---|---|---|---|---|
| Example PLA/PP System | 200 | KH-89 | PLA (H100) | MAPP (H1100P) | PP (MA04A) | 8.1 | 3.5 | 52 |
| | 200 | KH-96 | PLA (H100) | MAPP (H1100P) | PP (MA4AHB) | 8.1 | 3.9 | 61 |
| | 400 | KH-97 | PLA (H100) | MAPP (H1100P) | PP (MA4AHB) | 8.1 | 4.1 | 66 |

(4) Effect of Use of Resin Other than PP in Resin for Dilution

A molded article of the present invention (test number KH-317) was produced in the same manner as in the Example with test number KH-89, except that PP (MA04A) used for a resin for dilution in the Example (test number KH-89) was replaced with PE (J320).

The molded article of the present invention (test number KH-317) exhibited improvement in both elastic modulus and strength, compared with the molded article of the Comparative Example in which PE alone was used. This indicates that even when a resin for dilution other than PP is used, the use of the master batch of the present invention can improve both elastic modulus and strength.

TABLE 11

Table 11 (3-a) Effect of Use of PE in Resin for Dilution
("MB" in the table is an abbreviation for master batch.)

Components of Fiber-reinforced Resin Composition and Molded Artice
MF is present in an amount of 9.7% on an unmodified fiber basis.
Also, an antioxidant is present in an amount of 1%

| Test System | Test Number | Contained Fiber AclyMF is contained in MB, compositions, and molded articles in Examples. Type | DS | SP | Components of MB MF is present in an amount of 29.2% on an unmodified fiber basis. Also, an antioxidant is present in an amount of 2.9%. Resin for MB SP of Resin: PLA (21.4) Type | Content % | Compatibilizer SP of MAPP: PMA-L (8.17) Type | Content % | The type of resin for MB is the same as PLA in MB. Content % | Resin for dilution is present in an amount of 66.7% and compatibilzer is the same as MAPP in MB. Content % | The type of SP is 8.0 in all Examples. Type | Molded Article Strength Characteristics Tensile Elastic Modulus GPa | Tensile Strength MPa |
|---|---|---|---|---|---|---|---|---|---|---|---|---|---|
| Example PLA/PE System | KH-317 | AcNUKP (2) | 0.97 | 13.4 | PLA (3251D) | 46.4 | MAPP (PMA-L) | 14 | 15.5 | 4.7 | PE (J320) | 3.6 | 53 |
| Comparative Example | PE Alone | None | — | — | — | — | — | — | — | — | — | 1.4 | 26 |

(5) Content of Resin for Master Batch in Composite

A master batch was prepared in the same manner as in the Example with test number KH-313, except that the ratio of the modified plant fibers and the resin for a master batch in the Example (KH-313) was changed. Subsequently, the master batch was subjected to two-step dilution and kneading, and the result was used to prepare a molded article of the present invention (test number KH-388). The two-step dilution and kneading refer to a kneading method in which a master batch and a resin for dilution are molten-kneaded with a high fiber content (about 30% or more), and then a resin for dilution is further added to prepare a composite with a fiber content of about 10%.

Changing the ratio of modified plant fibers and a resin for a master batch provides a composite whose content of the resin for a master batch varies after dilution, regardless of the same fiber content. While the content of the resin for a master batch in the composite of the Example with test number KH-313 was 15.5%, the content of the resin for a master batch of Example with test number KH-388 was 3.9%. Because both of the Examples were substantially equivalent in elastic modulus and strength, this reveals that a preferable result can be achieved even with the content of the resin for a master batch in a composite being about 4%.

The composite of the Comparative Example with test number KH-371 was prepared in the same manner as in KH-388, except that the resin for a master batch was replaced with PP. While the Example with test number KH-388 had an elastic modulus of 4.1 GPa and a strength of 69 MPa, the Comparative Example with test number KH-371 had an elastic modulus of 3.5 GPa and a strength of 65 MPa, clearly indicating the advantage of using PLA, which has an SP value of 9 or more, in the resin for a master batch.

TABLE 12

Table 12 (4-a) Components of Master Batch (Master Batch is indicated as "MB")

| | | Components of MB | | | | | | | | | | |
|---|---|---|---|---|---|---|---|---|---|---|---|---|
| | | Contained Fiber | | | Chemically Modified Fiber Content % | | Resin for MB | | Compatibilizer | | | MB |
| Test System | Test Number | AcylMF is contained in MB in Examples. Type | DS | SP | Modified Group Portion | Fiber Portion | Type | SP | Content % | Type | SP | Content % | Antioxidant Content % | Kneading Method |
| Example PLA/PP System | KH-388 | AcNUKP (2) | 0.97 | 13.4 | 11.4 | 44.3 | PLA (3251D) | 11.4 | 18.1 | MAPP (PMA-HM) | 8.25 | 21.8 | 4.4 | Two-step (High Speed) |
| Comparative Example | KH-371 | AcNUKP (2) | 0.97 | 13.4 | 11.4 | 44.3 | PP (MA04A) | 11.4 | 18.1 | MAPP (PMA-HM) | 8.25 | 21.8 | 4.4 | Two-step (High Speed) |

TABLE 13

Table 13 (4-b) Formulation of Fiber-reinforced Resin Composition after First Dilution
(Master Batch is indicated as "MB")

| | | Formulation of Fiber-reinforced Resin Composition (after first dilution) | | | | | | | | | | | |
|---|---|---|---|---|---|---|---|---|---|---|---|---|---|
| | | Contained Fiber | | | Chemically Modified Fiber Content % | | Resin for MB | | Compatibilizer | | Resin for Dilution | | Antioxidant |
| Test System | Test Number | AcylMF is contained in MB of Examples. Type | DS | SP | Modified Group Portion | Fiber Portion | Type | Content % | Type | Content % | Type | SP | Content % | Content % |
| Example PLA/PP System | KH-388 | AcNUKP (2) | 0.97 | 13.4 | 7.3 | 28.3 | PLA (3251D) | 11.6 | MAPP (PMA-L) | 14.0 | PP (MA4AHB) | 8.1 | 36.0 | 2.8 |
| Comparative Example | KH-371 | AcNUKP (2) | 0.97 | 13.4 | 7.3 | 28.3 | PP (MA04A) | 11.6 | MAPP (PMA-L) | 14.0 | PP (MA4AHB) | 8.1 | 36.0 | 2.8 |

TABLE 14

Table 14 (4-c) Formulation of Fiber-reinforced Resin Composition after Second Dilution
(Master Batch is indicated as "MB")

| Test System | Test Number | Contained Fiber Type | DS | SP | Modified Fiber Content % Modified Group Portion | Fiber Portion | Resin for MB Type | Content % | Compatibilizer Type | Content % | Resin for Dilution Type | SP | Content % | Antioxidant Content % |
|---|---|---|---|---|---|---|---|---|---|---|---|---|---|---|
| Example PLA/PP System | KH-388 | AcNUKP (2) | 0.97 | 13.4 | 2.4 | 9.4 | PLA (3251D) | 3.9 | MAPP (PMA-L) | 4.7 | PP (MA4AHB) | 8.1 | 78.6 | 1 |
| Comparative Example | KH-371 | AcNUKP (2) | 0.97 | 13.4 | 2.4 | 9.4 | PP (MA04A) | 3.9 | MAPP (PMA-L) | 4.7 | PP (MA4AHB) | 8.1 | 78.6 | 1 |

TABLE 15

Table 15 (4-d) Strength Characteristics of Molded Article Formed from
Fiber-reinforced Resin Composition Produced by Two-step Dilution of Master Batch
(Master Batch is indicated as "MB")

| Test System | Test Number | Contained Fiber AcylMF is contained in MB, compositions, and molded articles in Examples. Type | DS | SP | Components of MB (MF is present in an amount of 44.3% on an unmodified fiber basis.) (In addition to the components described below, an antioxidant is present in an amount of 4.4%.) Resion for MB SP of Resin PP(8.1) PLA (11.4) Type | Content % | Compatibilizer SP of MAPP: PMA-HM (8.25) Type | Content % |
|---|---|---|---|---|---|---|---|---|
| Example PLA/PP System | KH-388 | AcNUKP (2) | 0.97 | 13.4 | PLA (3251D) | 18.1 | MAPP (PMA-L) | 21.8 |
| Comparative Example | KH-371 | AcNUKP (2) | 0.97 | 13.4 | PP (MA04A) | 18.1 | MAPP (PMA-L) | 21.8 |

| Test System | Test Number | Components of Fiber-reinforced Resin Composition and Molded Article (MF is present in an amount of 9.4% on an unmodified fiber basis.) (In addition to the components described below, an antioxidant is present in an amount of 1%.) Resin for MB (The type is the same as PLA in MB.) Content % | Compatibilizer (The type is the same as MAPP in MB.) Content % | Resin for Dilution (The content is 78.6% in both Examples.) (SP: 8.1 in both Examples) Type | Molded Article Strength Characteristics Tensile Elastic Modulus GPa | Tensile Strength MPa |
|---|---|---|---|---|---|---|
| Example PLA/PP System | KH-388 | 3.9 | 4.7 | PP (MA4AHB) | 4.1 | 69 |
| Comparative Example | KH-371 | 3.9 | 4.7 | PP (MA4AHB) | 3.5 | 65 |

The invention claimed is:

1. A master batch comprising:
   acylated, microfibrillated plant fibers (A);
   a thermoplastic resin (B); and
   a compatibilizer (C),
   wherein the master batch is for use in the production of a fiber-reinforced resin composition by mixing with a resin for dilution (D),
   wherein the master batch excludes alkyl or alkenyl succinic anhydride-modified plant fibers and microfibrillated plant fibers, and
   wherein the acylated, microfibrillated plant fibers (A), the thermoplastic resin (B), the compatibilizer (C), and the resin for dilution (D) satisfy the following conditions:
   (a) the acylated, microfibrillated plant fibers (A) have a solubility parameter ($SP_{acylmf}$) of 10 or more and are modified with an acyl group represented by the formula R—CO— wherein R represents an alkyl group having 1 to 5 carbon atoms,
   (b) the thermoplastic resin (B) has a solubility parameter ($SP_{pm}$) of 9 to 15, and the solubility parameter ($SP_{pm}$) is greater than the solubility parameter ($SP_{pd}$) of the resin for dilution (D), and
   (c) the compatibilizer (C) has a solubility parameter ($SP_{com}$) equal to or less than the solubility parameter ($SP_{acylmf}$) of the acylated, microfibrillated plant fibers (A).

2. The master batch according to claim 1, wherein the thermoplastic resin (B) is at least one resin selected from the group consisting of polylactic acid, copolymers of lactic acid and glycolic acid, polyamide, polyacetal, and copolymers of acetal and oxyethylene.

3. The master batch according to claim 1, wherein the compatibilizer (C) is at least one compatibilizer selected from the group consisting of modified polyolefins and graft copolymers of a different type of polymer and a polyolefin.

4. A fiber-reinforced resin composition comprising the master batch of claim 1 and a resin for dilution (D).

5. The fiber-reinforced resin composition according to claim 4, wherein the resin for dilution (D) is at least one resin selected from the group consisting of polyethylene, polypropylene, ethylene-propylene copolymers, polyisobutylene, polyisoprene, and polybutadiene.

6. A fiber-reinforced resin molded article comprising the fiber-reinforced resin composition of claim 4.

7. A method for producing a master batch comprising acylated, microfibrillated plant fibers (A), a thermoplastic resin (B), and a compatibilizer (C),
   wherein the master batch excludes alkyl or alkenyl succinic anhydride-modified plant fibers and microfibrillated plant fibers, and
   the master batch being for use in the production of a fiber-reinforced resin composition by mixing with a resin for dilution (D),
   the method comprising the step of
   melt-kneading acylated plant fibers (A') as a raw material of acylated, microfibrillated plant fibers (A), a thermoplastic resin (B), and a compatibilizer (C) to defibrate the acylated plant fibers (A') in a melt-kneaded product while melt-kneading,
   wherein the following conditions are satisfied:
   (a) the acylated, microfibrillated plant fibers (A) have a solubility parameter ($SP_{acylmf}$) of 10 or more and are modified with an acyl group represented by the formula R—CO— wherein R represents an alkyl group having 1 to 5 carbon atoms;
   (b) the thermoplastic resin (B) has a solubility parameter ($SP_{pm}$) of 9 to 15, and the solubility parameter ($SP_{pm}$) is greater than the solubility parameter ($SP_{pd}$) of the resin for dilution (D); and
   (c) the compatibilizer (C) has a solubility parameter ($SP_{com}$) equal to or less than the solubility parameter ($SP_{acylmf}$) of the acylated, microfibrillated plant fibers (A).

8. A method for producing a master batch comprising acylated, microfibrillated plant fibers (A), a thermoplastic resin (B), and a compatibilizer (C),
   wherein the master batch excludes alkyl or alkenyl succinic anhydride-modified plant fibers and microfibrillated plant fibers, and
   the master batch being for use in the production of a fiber-reinforced resin composition by mixing with a resin for dilution (D),
   the method comprising the steps of:
   (1) melt-kneading acylated plant fibers (A') as a raw material of acylated, microfibrillated plant fibers (A) and a thermoplastic resin (B) to defibrate the acylated plant fibers (A') in a melt-kneaded product while melt-kneading to obtain a melt-kneaded product containing the acylated, microfibrillated plant fibers (A),
   wherein the following conditions are satisfied:
   (a) the acylated, microfibrillated plant fibers (A) have a solubility parameter ($SP_{acylmf}$) of 10 or more and are modified with an acyl group represented by R—CO— wherein R represents an alkyl group having 1 to 5 carbon atoms; and
   (b) the thermoplastic resin (B) has a solubility parameter ($SP_{pm}$) of 9 to 15, and the solubility parameter ($SP_{pm}$) is greater than the solubility parameter ($SP_{pd}$) of the resin for dilution (D), and
   (2) adding a compatibilizer (C) to the melt-kneaded product containing the acylated, microfibrillated plant fibers (A) obtained in step (1) to further perform melt-kneading, wherein the following condition is satisfied:
   (c) the compatibilizer (C) has a solubility parameter ($SP_{com}$) equal to or less than the solubility parameter ($SP_{acylmf}$) of the acylated, microfibrillated plant fibers (A).

9. A method for producing a fiber-reinforced resin composition, the method comprising the steps of:
   (1) adding a resin for dilution (D) to the master batch of claim 1 to perform melt-kneading; and
   (2) further adding a resin for dilution (D) to the melt-kneaded product obtained in step (1) to perform melt-kneading.

* * * * *